US012152375B2

(12) United States Patent
Trescott et al.

(10) Patent No.: US 12,152,375 B2
(45) Date of Patent: *Nov. 26, 2024

(54) NON-INVASIVE THERMAL DISPERSION FLOW METER WITH FLUID LEAK DETECTION AND GEO-FENCING CONTROL

(71) Applicant: Sentinel Hydrosolutions, LLC, Escondido, CA (US)

(72) Inventors: Robert Trescott, San Marcos, CA (US); Scott Shaw, Brentwood, TN (US); Scott Pallais, Escondido, CA (US); Kenneth Fox, Escondido, CA (US)

(73) Assignee: Sentinel Hydrosolutions, LLC, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,176

(22) Filed: Nov. 14, 2023

(65) Prior Publication Data

US 2024/0191480 A1 Jun. 13, 2024

Related U.S. Application Data

(60) Continuation of application No. 16/041,216, filed on Jul. 20, 2018, now Pat. No. 11,814,821, which is a
(Continued)

(51) Int. Cl.
*E03B 7/07* (2006.01)
*E03B 7/08* (2006.01)
(Continued)

(52) U.S. Cl.
CPC ............... *E03B 7/071* (2013.01); *E03B 7/08* (2013.01); *E03B 7/09* (2013.01); *G01F 1/6847* (2013.01);
(Continued)

(58) Field of Classification Search
CPC ... E03B 7/071; E03B 7/08; E03B 7/09; G01F 1/6847; G01F 1/6888; G01F 1/69;
(Continued)

(56) References Cited

U.S. PATENT DOCUMENTS

| 4,999,613 A * | 3/1991 | Williamson | ........... G08B 21/22 |
| | | | 340/529 |
| 2004/0192342 A1* | 9/2004 | Ranganathan | .......... H04L 65/80 |
| | | | 455/446 |

(Continued)

*Primary Examiner* — Peter J Macchiarolo
*Assistant Examiner* — Anthony W Megna Fuentes
(74) *Attorney, Agent, or Firm* — Gary L. Eastman, Esq.; Eastman IP

(57) ABSTRACT

A non-invasive thermal dispersion flow meter with chronometric monitor for fluid leak detection includes a heater, an ambient temperature sensor and a flow rate sensor which are configured to sense the temperature of a fluid in a conduit, and then monitor the flow of that fluid through the conduit. The fluid flow sensor is incorporated into a Wheatstone bridge circuit, which is used to provide increased sensitivity to the outputs of the sensors, Based upon the ambient temperature sensor readings, the flow rate sensor and heater may be adjusted to optimize the operation of the system to detect leaks. An alternative embodiment utilizes a single sensor and separate heater which work together to determine heat propagation times which in turn is used to calculate flow rate. Based on the sensor readings, the flow may be adjusted to prevent damage and leaks by relieving the system of excess pressure.

20 Claims, 17 Drawing Sheets

Related U.S. Application Data continuation-in-part of application No. 15/396,346, filed on Dec. 30, 2016, now Pat. No. 10,036,143, which is a division of application No. 13/899,450, filed on May 21, 2013, now Pat. No. 9,759,632, which is a continuation-in-part of application No. 13/342,961, filed on Jan. 3, 2012, now Pat. No. 9,146,172.

(60) Provisional application No. 61/542,793, filed on Oct. 3, 2011, provisional application No. 61/429,242, filed on Jan. 3, 2011.

(51) Int. Cl.

| | |
|---|---|
| *E03B 7/09* | (2006.01) |
| *G01F 1/684* | (2006.01) |
| *G01F 1/688* | (2006.01) |
| *G01F 1/69* | (2006.01) |
| *G01F 1/696* | (2006.01) |
| *G01F 1/7084* | (2022.01) |
| *G01K 1/143* | (2021.01) |
| *G01K 13/02* | (2021.01) |
| *G01M 3/00* | (2006.01) |
| *G01M 3/28* | (2006.01) |

(52) U.S. Cl.
CPC .............. *G01F 1/6888* (2013.01); *G01F 1/69* (2013.01); *G01F 1/696* (2013.01); *G01F 1/7084* (2013.01); *G01K 1/143* (2013.01); *G01K 13/02* (2013.01); *G01M 3/002* (2013.01); *G01M 3/2807* (2013.01); *G01K 13/026* (2021.01)

(58) Field of Classification Search
CPC ....... G01F 1/696; G01F 1/7084; G01K 1/143; G01K 13/02; G01K 13/026; G01M 3/002; G01M 3/2807
See application file for complete search history.

(56) References Cited

U.S. PATENT DOCUMENTS

2005/0087230 A1* 4/2005 Henderson .............. E03B 7/071
  137/312
2013/0306170 A1* 11/2013 Rivera .................... E03B 7/071
  137/551
2017/0030528 A1* 2/2017 Dietzen .................... F17D 5/06

\* cited by examiner

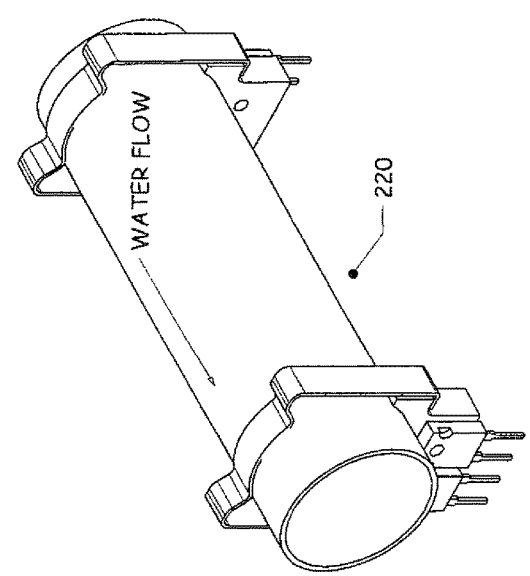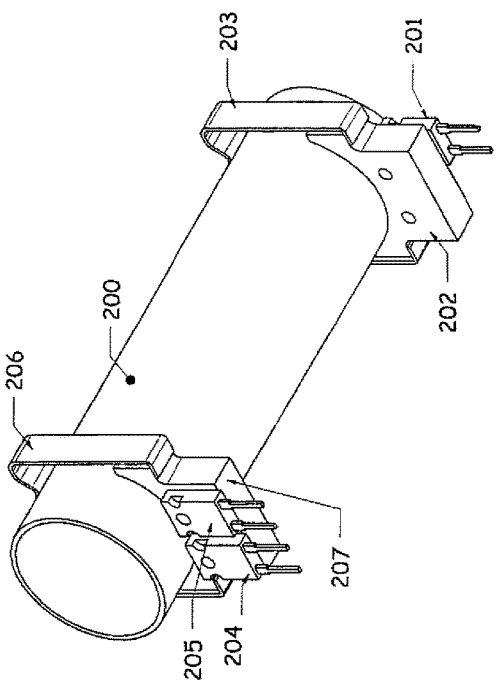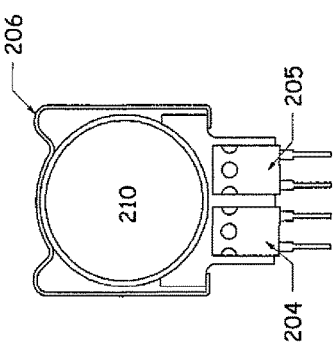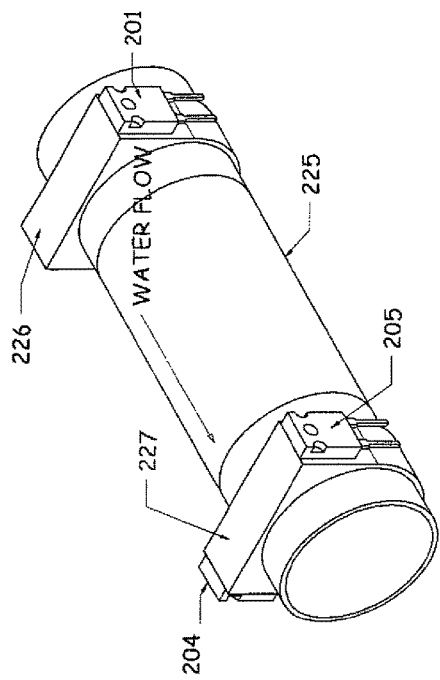
FIGURE 2
FIGURE 2A

Direct Pipe "Clamp-On" Flow Meter Leak Detector - Warm Test Data Points

| Time | No Flow | Low Flow | Med Flow | Heater | Time | No Flow | Low Flow | Med Flow | Heater |
|---|---|---|---|---|---|---|---|---|---|
| 1 | 75.86 | 75.80 | 75.57 | 75.00 | 51 | 80.92 | 78.27 | 76.31 | 75.00 |
| 2 | 75.91 | 75.80 | 75.57 | 75.00 | 52 | 80.92 | 78.16 | 76.25 | 75.00 |
| 3 | 75.91 | 75.74 | 75.57 | 75.00 | 53 | 80.81 | 78.05 | 76.25 | 75.00 |
| 4 | 75.91 | 75.80 | 75.63 | 75.00 | 54 | 80.69 | 77.99 | 76.25 | 75.00 |
| 5 | 75.91 | 75.80 | 75.63 | 75.00 | 55 | 80.64 | 77.94 | 76.19 | 75.00 |
| 6 | 75.86 | 75.80 | 75.63 | 75.00 | 56 | 80.52 | 77.82 | 76.14 | 75.00 |
| 7 | 75.91 | 75.80 | 75.57 | 75.00 | 57 | 80.47 | 77.77 | 76.14 | 75.00 |
| 8 | 75.97 | 75.80 | 75.57 | 81.67 | 58 | 80.36 | 77.71 | 76.08 | 75.00 |
| 9 | 75.91 | 75.74 | 75.57 | 81.67 | 59 | 80.30 | 77.66 | 76.08 | 75.00 |
| 10 | 75.91 | 75.80 | 75.57 | 81.67 | 60 | 80.24 | 77.54 | 76.08 | 75.00 |
| 11 | 75.97 | 75.86 | 75.63 | 81.67 | 61 | 80.13 | 77.49 | 76.02 | 75.00 |
| 12 | 76.08 | 75.97 | 75.74 | 81.67 | 62 | 80.02 | 77.43 | 76.02 | 75.00 |
| 13 | 76.19 | 76.08 | 75.80 | 81.67 | 63 | 79.96 | 77.32 | 76.02 | 75.00 |
| 14 | 76.36 | 76.25 | 75.91 | 81.67 | 64 | 79.91 | 77.32 | 75.97 | 75.00 |
| 15 | 76.53 | 76.42 | 76.02 | 81.67 | 65 | 79.85 | 77.26 | 75.97 | 75.00 |
| 16 | 76.76 | 76.59 | 76.08 | 81.67 | 66 | 79.79 | 77.21 | 75.97 | 75.00 |
| 17 | 76.92 | 76.76 | 76.25 | 81.67 | 67 | 79.68 | 77.15 | 75.97 | 75.00 |
| 18 | 77.15 | 76.92 | 76.42 | 81.67 | 68 | 79.57 | 77.09 | 75.97 | 75.00 |
| 19 | 77.37 | 77.15 | 76.53 | 81.67 | 69 | 79.57 | 77.04 | 75.91 | 75.00 |
| 20 | 77.66 | 77.32 | 76.64 | 81.67 | 70 | 79.46 | 76.98 | 75.86 | 75.00 |
| 21 | 77.88 | 77.49 | 76.70 | 81.67 | 71 | 79.46 | 76.92 | 75.91 | 75.00 |
| 22 | 78.11 | 77.71 | 76.81 | 81.67 | 72 | 79.34 | 76.92 | 75.86 | 75.00 |
| 23 | 78.39 | 77.88 | 76.92 | 81.67 | 73 | 79.29 | 76.87 | 75.86 | 75.00 |
| 24 | 78.67 | 78.11 | 76.98 | 81.67 | 74 | 79.23 | 76.87 | 75.91 | 75.00 |
| 25 | 78.95 | 78.27 | 77.04 | 81.67 | 75 | 79.17 | 76.81 | 75.86 | 75.00 |
| 26 | 79.23 | 78.44 | 77.15 | 81.67 | 76 | 79.17 | 76.76 | 75.86 | 75.00 |
| 27 | 79.51 | 78.61 | 77.21 | 81.67 | 77 | 79.06 | 76.70 | 75.86 | 75.00 |
| 28 | 79.85 | 78.78 | 77.26 | 81.67 | 78 | 79.01 | 76.64 | 75.86 | 75.00 |
| 29 | 80.07 | 78.95 | 77.32 | 75.00 | 79 | 78.95 | 76.64 | 75.86 | 75.00 |
| 30 | 80.41 | 79.12 | 77.37 | 75.00 | 80 | 78.89 | 76.59 | 75.80 | 75.00 |
| 31 | 80.69 | 79.23 | 77.43 | 75.00 | 81 | 78.89 | 76.59 | 75.80 | 75.00 |
| 32 | 80.97 | 79.40 | 77.43 | 75.00 | 82 | 78.84 | 76.59 | 75.80 | 75.00 |
| 33 | 81.14 | 79.46 | 77.43 | 75.00 | 83 | 78.78 | 76.53 | 75.80 | 75.00 |
| 34 | 81.37 | 79.51 | 77.43 | 75.00 | 84 | 78.72 | 76.47 | 75.80 | 75.00 |
| 35 | 81.48 | 79.57 | 77.32 | 75.00 | 85 | 78.72 | 76.42 | 75.80 | 75.00 |
| 36 | 81.59 | 79.51 | 77.32 | 75.00 | 86 | 78.67 | 76.47 | 75.80 | 75.00 |
| 37 | 81.65 | 79.46 | 77.21 | 75.00 | 87 | 78.61 | 76.47 | 75.80 | 75.00 |
| 38 | 81.65 | 79.40 | 77.21 | 75.00 | 88 | 78.56 | 76.42 | 75.80 | 75.00 |
| 39 | 81.71 | 79.34 | 77.04 | 75.00 | 89 | 78.56 | 76.36 | 75.80 | 75.00 |
| 40 | 81.71 | 79.29 | 76.98 | 75.00 | 90 | 78.50 | 76.36 | 75.80 | 75.00 |
| 41 | 81.65 | 79.17 | 76.92 | 75.00 | OHEAT (deg) | 4 | | | |
| 42 | 81.65 | 79.12 | 76.87 | 75.00 | HEAT time (sec) | 21 | 21 | 21 | |
| 43 | 81.59 | 79.01 | 76.76 | 75.00 | Peak temp (deg) | 81.71 | 79.57 | 77.43 | |
| 44 | 81.54 | 78.89 | 76.70 | 75.00 | Peak temp delta | 5.85 | 3.77 | 1.86 | |
| 45 | 81.48 | 78.84 | 76.64 | 75.00 | Max temp time | 10 | 6 | 2 | |
| 46 | 81.42 | 78.72 | 76.59 | 75.00 | FinTemp | 4.38 | 1.74 | 0.51 | |
| 47 | 81.31 | 78.61 | 76.53 | 75.00 | Score | 49.65 | 14.21 | 2.88 | |
| 48 | 81.26 | 78.56 | 76.47 | 75.00 | MinTemp | 75.86 | | | |
| 49 | 81.14 | 78.44 | 76.42 | 75.00 | SpanTemp | 5.85 | | | |
| 50 | 81.03 | 78.33 | 76.36 | 75.00 | | | | | |

FIGURE 10B

Direct Pipe "Clamp-On" Flow Meter Leak Detector - Cold Test Data Points

| Time | No Flow | Low Flow | Med Flow | Heater | Time | No Flow | Low Flow | Med Flow | Heater |
|---|---|---|---|---|---|---|---|---|---|
| 1 | 38.00 | 38.06 | 38.06 | 37.50 | 51 | 42.67 | 40.47 | 38.79 | 37.50 |
| 2 | 37.94 | 38.06 | 38.06 | 37.50 | 52 | 42.67 | 40.36 | 38.79 | 37.50 |
| 3 | 38.00 | 38.06 | 38.06 | 37.50 | 53 | 42.61 | 40.25 | 38.73 | 37.50 |
| 4 | 37.94 | 38.11 | 38.06 | 37.50 | 54 | 42.56 | 40.19 | 38.67 | 37.50 |
| 5 | 38.00 | 38.06 | 38.11 | 37.50 | 55 | 42.56 | 40.14 | 38.67 | 37.50 |
| 6 | 37.94 | 38.06 | 38.06 | 37.50 | 56 | 42.50 | 40.08 | 38.62 | 37.50 |
| 7 | 38.00 | 38.06 | 38.06 | 43.38 | 57 | 42.44 | 39.97 | 38.62 | 37.50 |
| 8 | 38.00 | 38.06 | 38.06 | 43.38 | 58 | 42.39 | 39.91 | 38.56 | 37.50 |
| 9 | 37.94 | 38.11 | 38.11 | 43.38 | 59 | 42.39 | 39.86 | 38.56 | 37.50 |
| 10 | 38.00 | 38.06 | 38.11 | 43.38 | 60 | 42.33 | 39.80 | 38.51 | 37.50 |
| 11 | 38.06 | 38.11 | 38.11 | 43.38 | 61 | 42.27 | 39.74 | 38.51 | 37.50 |
| 12 | 38.17 | 38.22 | 38.17 | 43.38 | 62 | 42.22 | 39.69 | 38.51 | 37.50 |
| 13 | 38.28 | 38.34 | 38.28 | 43.38 | 63 | 42.16 | 39.63 | 38.45 | 37.50 |
| 14 | 38.39 | 38.39 | 38.39 | 43.38 | 64 | 42.16 | 39.57 | 38.45 | 37.50 |
| 15 | 38.56 | 38.56 | 38.51 | 43.38 | 65 | 42.11 | 39.52 | 38.39 | 37.50 |
| 16 | 38.79 | 38.79 | 38.62 | 43.38 | 66 | 42.11 | 39.46 | 38.39 | 37.50 |
| 17 | 39.01 | 38.90 | 38.73 | 43.38 | 67 | 41.99 | 39.41 | 38.39 | 37.50 |
| 18 | 39.24 | 39.07 | 38.84 | 43.38 | 68 | 41.94 | 39.41 | 38.39 | 37.50 |
| 19 | 39.41 | 39.29 | 38.96 | 43.38 | 69 | 41.88 | 39.35 | 38.39 | 37.50 |
| 20 | 39.69 | 39.46 | 39.07 | 43.38 | 70 | 41.88 | 39.24 | 38.34 | 37.50 |
| 21 | 39.86 | 39.63 | 39.12 | 43.38 | 71 | 41.82 | 39.24 | 38.34 | 37.50 |
| 22 | 40.08 | 39.80 | 39.24 | 43.38 | 72 | 41.77 | 39.24 | 38.34 | 37.50 |
| 23 | 40.36 | 39.97 | 39.35 | 43.38 | 73 | 41.77 | 39.18 | 38.34 | 37.50 |
| 24 | 40.59 | 40.08 | 39.46 | 43.38 | 74 | 41.71 | 39.12 | 38.28 | 37.50 |
| 25 | 40.81 | 40.31 | 39.52 | 43.38 | 75 | 41.71 | 39.07 | 38.28 | 37.50 |
| 26 | 41.09 | 40.47 | 39.57 | 43.38 | 76 | 41.66 | 39.01 | 38.22 | 37.50 |
| 27 | 41.21 | 40.64 | 39.63 | 43.38 | 77 | 41.60 | 39.01 | 38.28 | 37.50 |
| 28 | 41.54 | 40.76 | 39.74 | 43.38 | 78 | 41.60 | 39.01 | 38.22 | 37.50 |
| 29 | 41.77 | 40.98 | 39.80 | 37.50 | 79 | 41.54 | 38.96 | 38.22 | 37.50 |
| 30 | 42.05 | 41.09 | 39.86 | 37.50 | 80 | 41.49 | 38.90 | 38.22 | 37.50 |
| 31 | 42.22 | 41.26 | 39.91 | 37.50 | 81 | 41.43 | 38.90 | 38.28 | 37.50 |
| 32 | 42.39 | 41.32 | 39.91 | 37.50 | 82 | 41.43 | 38.84 | 38.22 | 37.50 |
| 33 | 42.61 | 41.37 | 39.97 | 37.50 | 83 | 41.43 | 38.79 | 38.22 | 37.50 |
| 34 | 42.67 | 41.49 | 39.86 | 37.50 | 84 | 41.37 | 38.79 | 38.22 | 37.50 |
| 35 | 42.84 | 41.49 | 39.86 | 37.50 | 85 | 41.32 | 38.79 | 38.22 | 37.50 |
| 36 | 42.89 | 41.49 | 39.80 | 37.50 | 86 | 41.32 | 38.73 | 38.22 | 37.50 |
| 37 | 43.01 | 41.49 | 39.69 | 37.50 | 87 | 41.26 | 38.73 | 38.22 | 37.50 |
| 38 | 42.95 | 41.43 | 39.63 | 37.50 | 88 | 41.21 | 38.67 | 38.22 | 37.50 |
| 39 | 43.06 | 41.37 | 39.57 | 37.50 | 89 | 41.21 | 38.67 | 38.22 | 37.50 |
| 40 | 43.01 | 41.26 | 39.52 | 37.50 | 90 | 41.15 | 38.67 | 38.17 | 37.50 |
| 41 | 43.01 | 41.21 | 39.41 | 37.50 | OHEAT (deg) | 4 | | | |
| 42 | 43.01 | 41.15 | 39.35 | 37.50 | HEAT time (sec) | 21 | 21 | 21 | |
| 43 | 43.01 | 41.09 | 39.29 | 37.50 | Peak temp (deg) | 43.06 | 41.49 | 39.97 | |
| 44 | 42.95 | 40.98 | 39.24 | 37.50 | Peak temp delta | 5.06 | 3.43 | 1.91 | |
| 45 | 42.95 | 40.92 | 39.12 | 37.50 | Max temp time | 10 | 5 | 4 | |
| 46 | 42.89 | 40.81 | 39.07 | 37.50 | FinTemp | 4.33 | 1.74 | 0.45 | |
| 47 | 42.84 | 40.81 | 39.01 | 37.50 | Score | 48.36 | 12.13 | 3.71 | |
| 48 | 42.84 | 40.70 | 38.96 | 37.50 | MinTemp | 37.94 | | | |
| 49 | 42.78 | 40.59 | 38.96 | 37.50 | SpanTemp | 5.12 | | | |
| 50 | 42.72 | 40.53 | 38.84 | 37.50 | | | | | |

FIGURE 11B

NON-INVASIVE THERMAL DISPERSION FLOW METER WITH FLUID LEAK DETECTION AND GEO-FENCING CONTROL

RELATED APPLICATIONS

This application is a Continuation of U.S. Utility patent application Ser. No. 16/041,216 filed Jul. 20, 2018, entitled "Non-Invasive Thermal Dispersion Flow Meter With Fluid Leak Detection And Freeze Burst Prevention," and currently co-pending, which is a Continuation in Part of U.S. Utility patent application Ser. No. 15/396,346 filed Dec. 30, 2016, entitled "Non-Invasive Thermal Dispersion Flow Meter With Fluid Leak Detection And Freeze Burst Prevention," which is a Divisional of U.S. Utility patent application Ser. No. 13/899,450 filed May 21, 2013, entitled "Non-invasive Thermal Dispersion Row Meter with Chronometric Monitor for Fluid Leak Detection and Freeze Burst Prevention," which in turn is a Continuation-in-Part of U.S. Utility patent application Ser. No. 13/342,961 filed Jan. 3, 2012, entitled "Noninvasive Thermal Dispersion Flow Meter with Chronometric Monitor for Fluid Leak Detection," and currently issued as U.S. Pat. No. 9,146,172, which issued on Sep. 29, 2015, which in turn claims benefit of priority to U.S. Provisional Patent Application Ser. No. 61/429,242 filed Jan. 3, 2011, entitled "Noninvasive Thermal Dispersion Flow Meter with Chronometric Monitor for Fluid Leak Detection," and also to U.S. Provisional Patent Application Ser. No. 61/542,793 filed on Oct. 3, 2011, entitled "Direct Pipe Clamp on Flow Meter Leak Detector." Each of the above-cited applications is incorporated herein by reference.

FIELD OF THE INVENTION

The present invention relates generally to the field of fluid leakage detection. More particularly, the present invention relates to devices useful for the monitoring and evaluation of fluid flow rates. The present invention is more particularly, though not exclusively, useful as a non-invasive leak detection system capable of detecting even the smallest fluid leakage within a fluid conduit system, terminating fluid flow in response to the leak, and providing other indication, alert, and control functions.

BACKGROUND OF THE INVENTION

In the process of residential or commercial building construction, builders will frequently pre-plumb water supply pipes, and then encase the foundation level plumbing within a concrete mixture creating a floor slab. The plumbing will remain in use for the existence of the structure until it fails and leaks. Slab leaks typically start when a pinhole size rupture forms in a pipe or fitting from a period of constant pressure, friction with the slab material, and thermal expansion and contraction. As more water passes through the opening, in time, the size of the rupture increases. Undetected, the escaping water will eventually flood the foundation, damage floors and walls and ultimately undermine the ground beneath the structure due to erosion. The control of water has challenged man since the beginning. The world today benefits and suffers from the conveyance and containment of this life giving fluid. No matter the culture, the class, or the location, similar issues are considered, such as materials, installation, pressures, maintenance, effects of internal and external conditions, including water quality, climactic conditions, electrolysis, etc, Issues with any one of these may result in undesirable effects and damages.

Leaks can be slow and gradual, taking years to detect until significant property damage occurs, or there can be large leaks that quickly produce a variety of damaging results. Significant costs are expended everyday all over the world from these water-related damages. The costs are so extensive and pervasive, that nearly everyone in our modern world has been personally affected.

Leaks occur at all phases of water system function, both during and after construction. During construction leaks result from improper installation, faulty materials, testing, unintentional trade damage, and vandalism—to name a few. Once a water system is installed, formation of leaks occur due to corrosion, environmental effects, and improper maintenance. An exemplary example of environmental effects causing leaks is during periods of extended below zero temperatures. When water is below its freezing point, the water turns from a liquid phase into a solid phase resulting in an increase of volume. An increase in volume in a closed system increases the system pressure causing strain and compromising the structural integrity of the system, eventually causing a leak.

Costs are spread between responsible parties, insurance companies and often to those not responsible who cannot prove otherwise, or because responsible parties have no ability to pay the frequently large damages. Virtually anyone in the construction industry can tell you horror stories about water damage during their most recent project. Most in the industry accept these damages simply as part of the construction world and never consider there may actually be a solution to eliminate or minimize these damages.

Once a building, home or facility becomes occupied, the risks of leaks may shift, but still remain as a liability, as any insurance underwriter can attest. The repair and refurbishment resulting from leaks is an enormous industry, most recently exacerbated by the scares and realities of mold. Slow, hard to detect leaks within walls, ceilings or concealed areas often result in the most damage, as they introduce moisture into a warm, stable atmosphere of a controlled environment, resulting in mold growth that can cause extensive damage and may include condemnation of the home or building.

Large leaks or ruptures can be catastrophic within a very short amount of time, sometimes within minutes, In commercial structures, leaks can damage computer systems resulting in untold losses of computer data. These risks are not simply limited to property damage, but include personal injury and even death. Toxic mold has verifiably taken a number of lives. Leaks also substantially increase the risk of electrical shock, not to mention medically sensitive risks caused by leaks. Leaks are indiscriminate of time, occurring when occupants are present or away.

Until recently the prevention of leaks and/or mitigation of leak damages have been very limited. The "Loss Prevention" programs of insurance companies have focused primarily on minimizing the underwriting of clients with a history of previous leak claims rather than providing any true measure of "Loss Prevention".

It is known that existing water meters are capable of detecting and reporting water consumption, but these systems, which employ paddle wheels, turbines, or other such impellers, suffer from mechanical limitations which allow for small flow amounts to slip past the meter undetected and do not monitor water temperatures.

SUMMARY OF THE INVENTION

In a preferred embodiment of the present invention, the leak detection system is a water flow monitor and alarm system for detecting water leaking from the pressurized pipes or fixtures in residential and commercial building structures. The sensor probes have no moving parts to wear out and can detect water flow as little as a few ounces of water per hour. If water flows continuously for a preset time without stopping, it triggers an alarm. It may also trigger other functions associated with the system such as a display change and valve control. The alarm function can be set to alert the homeowner or a surveillance company monitoring the premises. Integrated into the system are user guides and features to aid the homeowner or a professional in detecting a leak.

Such an alarm condition could indicate a faulty valve or a more serious condition known as a "slab leak". An undetected slab leak (a broken pipe in or under a concrete slab floor) can cause extreme structural damage in excess of thousands of dollars, and render the property uninsurable from the resulting insurance claim.

In the preferred embodiment, two separate sensor probes are clamped directly onto the outside of a pipe or thermally conductive heat transfer medium between the fluid and the system to allow detection of all flow conditions. Not just water loss under the hot water heater or dishwasher or an icemaker like other point of leak detection competitive devices, but water loss for the entire structure. A comprehensive system may include moisture sensors together with the leak detection system. This will ensure both immediate and long-term protection of the structure and its contents and detect leaks from the pressurized supply side as well as the drain and waste systems, appliances, and water intrusion from the outside environment. Resource conservation and water cost savings are also promoted by detecting unknown water loss long before thousands of gallons escape down the drain or into the structure's foundation.

The preferred embodiment works by measuring the temperature at the upstream and downstream clamps. The downstream clamp contains both a temperature sensor and a heating element. The two temperature sensors form part of the sensing portion of a Wheatstone Bridge where the amount of heat energy added by the heating element to keep the bridge circuit in balance is proportional to the flow rate of fluid in the pipe.

In an alternative embodiment, a single temperature sensor and a separate heating element are clamped onto a pipe. The heating element is located a few inches downstream from the temperature sensor. The sensor and the heating element are both wrapped with insulation thereby isolating the sensor and heating element from ambient conditions and increasing the accuracy of the measurements and the sensitivity of the system. This embodiment works by measuring temperature before the heater is energized, then energizing the heater for a predetermined period of time. The temperature is continuously monitored to determine the amount of time for the heat energy added by the heater to propagate to the temperature sensor. That amount of time is used to determine the flow rate in the pipe. The longer the time for the heat energy to reach the sensor, the higher the flow rate is within the pipe. The shorter the time for the heat energy to reach the sensor, the lower the flow rate is within the pipe. After the propagation time is determined, the heater is deenergized to allow it and the sensor to return to ambient conditions so a new test can be performed.

In an alternative embodiment, the addition of an external environment sensor probe and temperature sensor package to a leak detection system creates a more comprehensive system able to prevent and detect leaks. The alternative embodiment works by taking the temperature at the temperature sensor package of the leak detection system, the external environment temperature sensor, and the additional temperature sensor package and feeding the data to a microprocessor where they are analyzed to determine whether the fluid is expanding by comparing the temperature data to the user inputted data stored in a control ROM and flash memory. If expansion is occurring, the microprocessor will open a relief valve and cause fluid to flow, releasing excess pressure and preventing damage to the structure's pipe system. In extreme conditions, the microprocessor will shut off the isolation valve to prevent additional fluid from entering the system and open a relief valve and cause fluid to flow, releasing excess pressure in the system. The microprocessor will then open an air valve to aid the evacuation of the fluid in the system.

The control panel is easy to use and attractive. Its display provides real-time system and flow status. The Panel will indicate an alarm condition; the flow level when the alarm occurred, and sound a built-in beeper, then if no action is taken it will activate an industrial quality motor-driven ball valve to shut off the water to the structure. The control panel will then display information to guide the homeowner through the process of detecting simple leaks such as a dripping faucet. The panel can also be used to select other operating modes or select other features of the leak detection system such as monitoring the fluid temperature and external environment temperature to prevent overpressure of the structure's pipe system When the leak detection system is connected to an autodialer telephone device, it can alert anyone with a telephone that a problem exists. When connected to an electric water valve, which is the design for the initial product, it can shut-off the water automatically until the system is manually reset. Other devices may be connected to the leak detection system to coordinate moisture and over-pressure sensors and leak detection throughout the entire structure.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 contains three perspective views of the noninvasive sensors when clamped onto a metal pipe;

FIG. 2A is a perspective view of the sensors and heater when clamped onto a plastic pipe through in-molding thermal carriers;

FIGS. 10A and 10B consist of a graph and its associated data points respectively. The figures show temperature changes over time for no flow, low flow, and medium flow conditions in response to turning on the heater for a predetermined period of time when the ambient temperature is approximately 75.degree. F.;

FIGS. 11A and 11B consist of a graph with its associated data points which shows temperature changes over time for no flow, low flow, and medium flow conditions in response to turning on the heater for a predetermined period of time when the ambient temperature is approximately 37.degree. F.;

DETAILED DESCRIPTION OF A PREFERRED EMBODIMENT

This invention relates to an electronic thermal monitor system intended to measure fluid flow within a conduit or pipe, by clamping directly to the outside of a pipe or onto a thermally conductive heat transfer medium between the fluid and the system.

Figure 1:
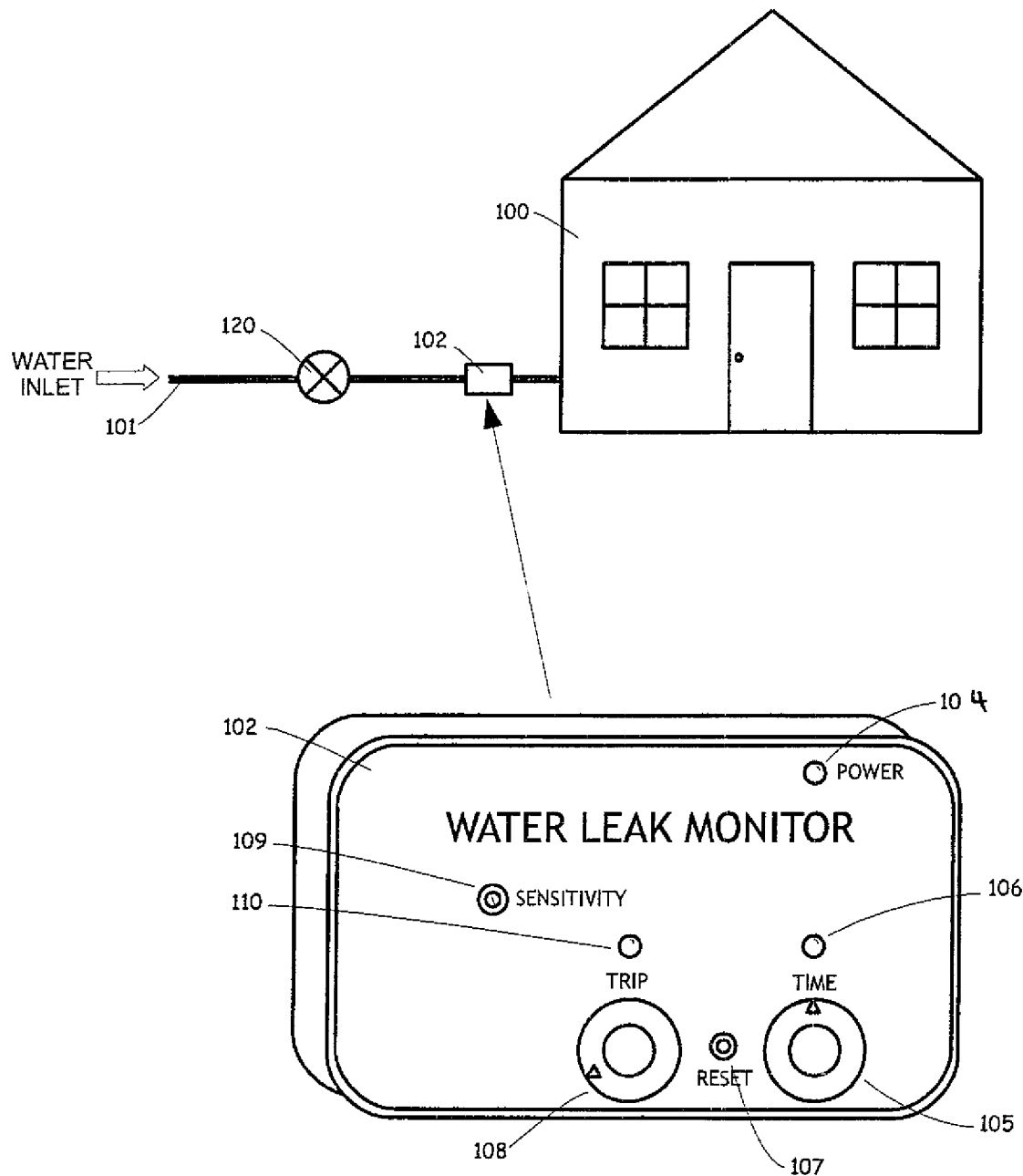
FIG. 1 is an exemplary view of the controller of the present invention as integrated with a structure, and showing the status panel of the system including an alarm indicator, an auxiliary indicator, a flow indicator, and a power indicator.

Referring to FIG. 1, the present invention is suitable for application of leak detection technology into a structure 100 having a water inlet 101, a water leak monitor 102, and a shut off valve 120. The water leak monitor 102 includes a power indicator 104, a timer set 105 with an indicator 106, and a trip level set 108 with an indicator 110. Sensitivity adjustment 109 provides a user the ability to adjust the sensitivity of the device. A reset button 107 is provided to allow for the system to be reset after an alarm condition has been generated.

In an exemplary embodiment, this invention is discussed in conjunction with a typical thin wall copper pipe section commonly found in commercial and residential plumbing systems that form the water supply line. Since copper is an excellent conductor of temperature, this meter infers the water temperature by measuring the outside skin temperature of the pipe section. Another embodiment is to measure fluid flow within a confined conduit whereby the thermally conductive transfer medium is embedded within the conduit and allows for unimpeded and low heat measurements of fluids such as gasoline, diesel oil, liquid slurries, as well as gases such as air or nitrogen.

The thermal conduction means in the exemplary embodiment are clamps which mount to the pipe and form not only a mechanical connection between the meter and the pipe, but a thermal connection as well. The clamps are designed to transfer heat to and from the meter and the water within the pipe. The pipe may be any shape to contain the fluid and allow a thermal conduction means to the fluid within.

In the exemplary embodiment there is one upstream temperature reference clamp that contains an integrated temperature sensing element, such as a thermistor, thermocouple, or resistance temperature detector ("RTD"), which reads the current temperature of the pipe and fluid within. A second sensor clamp, mounted downstream from the reference, also contains an integrated temperature sensing element and a resistive heater which transfers heat energy into the pipe and the water within. This clamp performs the actual flow rate measurement.

Referring to FIG. 2, the clamps are comprised of a heat sink mount or "shoe" 202 and 207 which partially wraps around the outside diameter of the copper pipe 200, and are retained by spring clips 203 and 206 to keep them firmly pressed onto the pipe 200. The sensor/heat shoe 207 has mounting holes for both the thermistor 205 and the heater 204. The reference temperature shoe 202 has mounting holes for the reference thermistor 201. Since copper pipe 200 comes in various diameters, the shoes 202 and 207 may be configured in varying sizes and widths depending on the amount of surface area that is required to perform effective temperature coupling and heater loading.

While FIG. 2 depicts an exemplary embodiment of the electronic components 201, 204, and 205 with unconnected leads, it should be noted that either a single printed circuit board will be connected to these leads or additional wires will be added to these leads to form a remote control operation.

Additionally, FIG. 2A depicts a means to transfer heat through plastic pipe 225 by in-molding thermal carriers 226 and 227 and mounting the thermistors 201 and 205 and heater 204 directly to these thermal carriers 226 and 227. This method allows this invention to operate using non-thermally conductive materials such as plastic, Teflon, ABS, PVC, etc.

Figure 3:
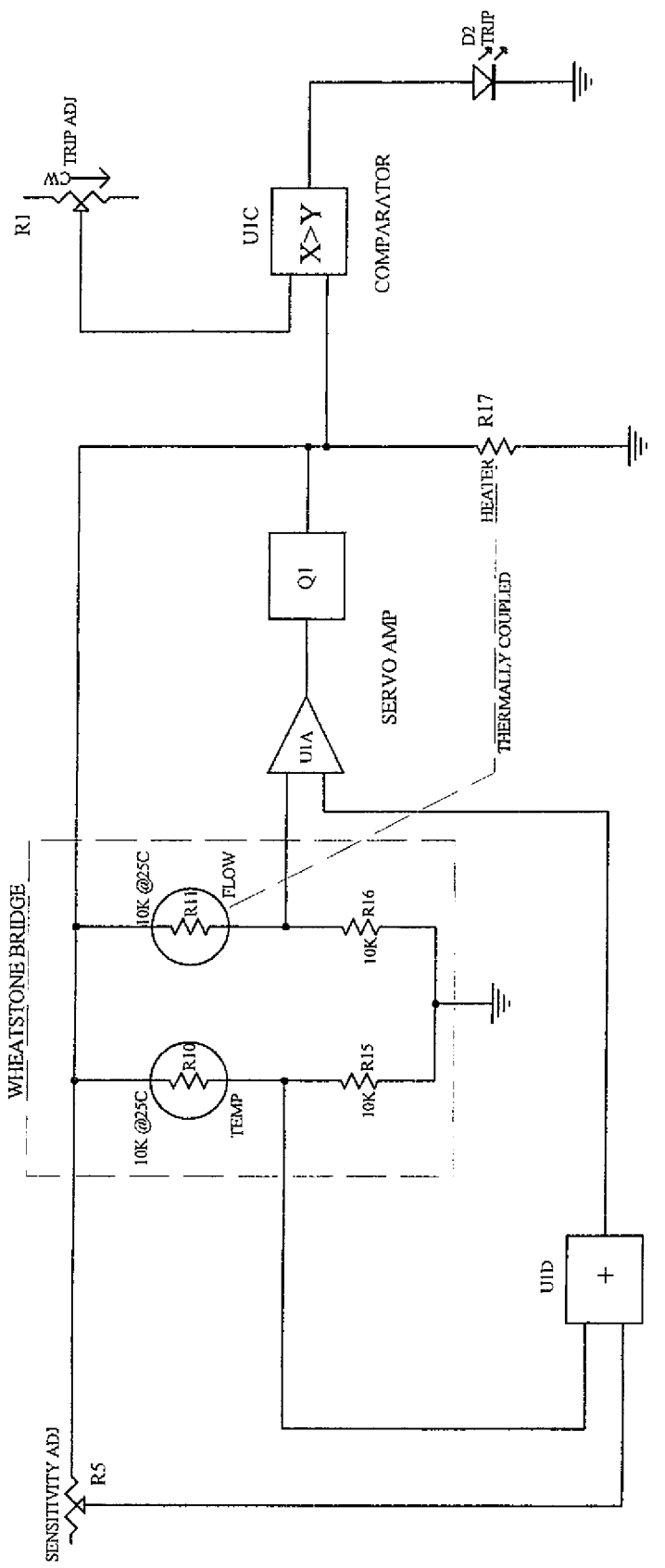
FIG. 3 is a basic electrical schematic diagram showing the implementation of a Wheatstone bridge used to sense the energy required to balance the bridge, and to energize an LED when the detected flow rate is above an adjustable level.

Referring to FIG. 3, as the heater R17 increases in temperature, the thermally coupled thermistor R11 senses the temperature change and adjusts the servo amp U1A to maintain the equilibrium of the Wheatstone Bridge circuit by modulating the power transistor Q1, The power transistor Q1 will either add or subtract power to the heater R17 to maintain the Wheatstone Bridge in balance. This system forms a closed loop feedback when the servo amp U1A reads the reference temperature thermistor R10, adds in the sensitivity bias voltage U1D, and then compares it to the current flow R11 temperature. This operation allows the reference thermistor R10 to adjust the circuit for any changes in incoming water temperature and allows the heater R17 to provide a constant temperature above the incoming water main as set by the sensitivity adjustment R5. Greater water flows require more heat to maintain this temperature difference and it is the amount of power consumed by the heater, to balance the bridge, which is read by the comparator U1C, to establish a flow trip threshold which is adjustable via resistor R1. If heater power increases above the preset trip threshold, the comparator U1C will activate and glow the TRIP LED D2 which, in other embodiments, may also be connected to a micro-controller to monitor flow and time.

Figure 4:
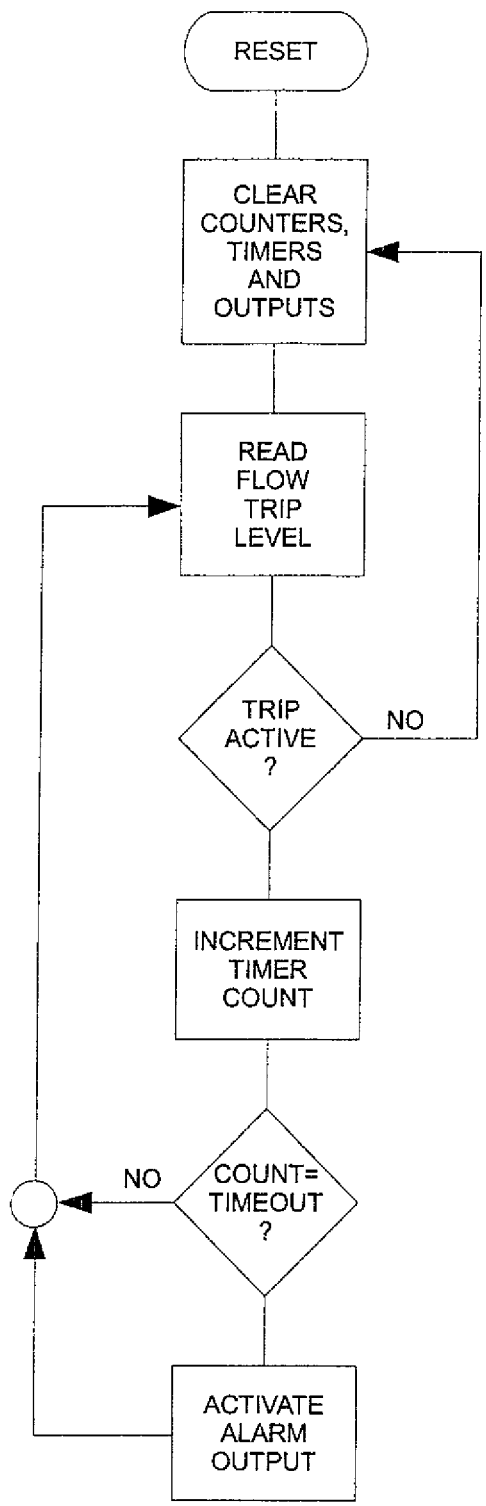
FIG. 4 is a flow diagram of an exemplary operation of the system of the present invention, and includes a sequence of operation when employing a microprocessor controller to monitor the trip level and timer settings.

FIG. 4 is a flowchart that describes an embodiment with a sequence of operations when employing a microprocessor controller to monitor the trip level and timer settings. When the trip level is exceeded, a counter is continuously incremented until it matches the timeout setting at which time the alarm output is activated. In this example, the alarm will automatically cancel once the trip value falls below the trip threshold, however some installations require latching the alarm on when tripped so it will remain active after the flow has been shut-off by employing an electric water shut-off valve 120 (not shown). The alarm output can be hard wired to existing commercial alarm panels. The alarm output signal may also drive a low power RF transmitter and pass its status via wireless signal.

Figure 5:
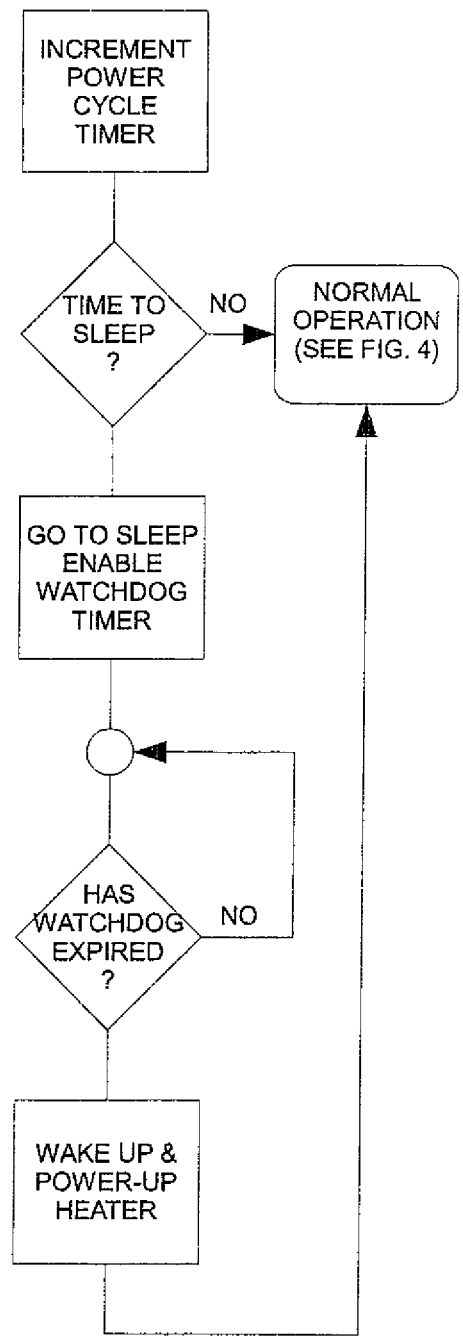
FIG. 5 is a flow diagram of an exemplary operation of the system of the present invention, and includes a sequence of operation when employing a microprocessor controller to cycle heater power to conserve energy and prevent excessive heating of the pipe section.

Referring to FIG. 5, the micro-controller may also be configured to cycle heater power to conserve energy and prevent excessive heating of the copper pipe section. Detection of the leak will still occur when the unit powers up and performs its leak tests over time. After the system wakes up and applies power to the heaters, the system will go into normal operation.

Figure 6:
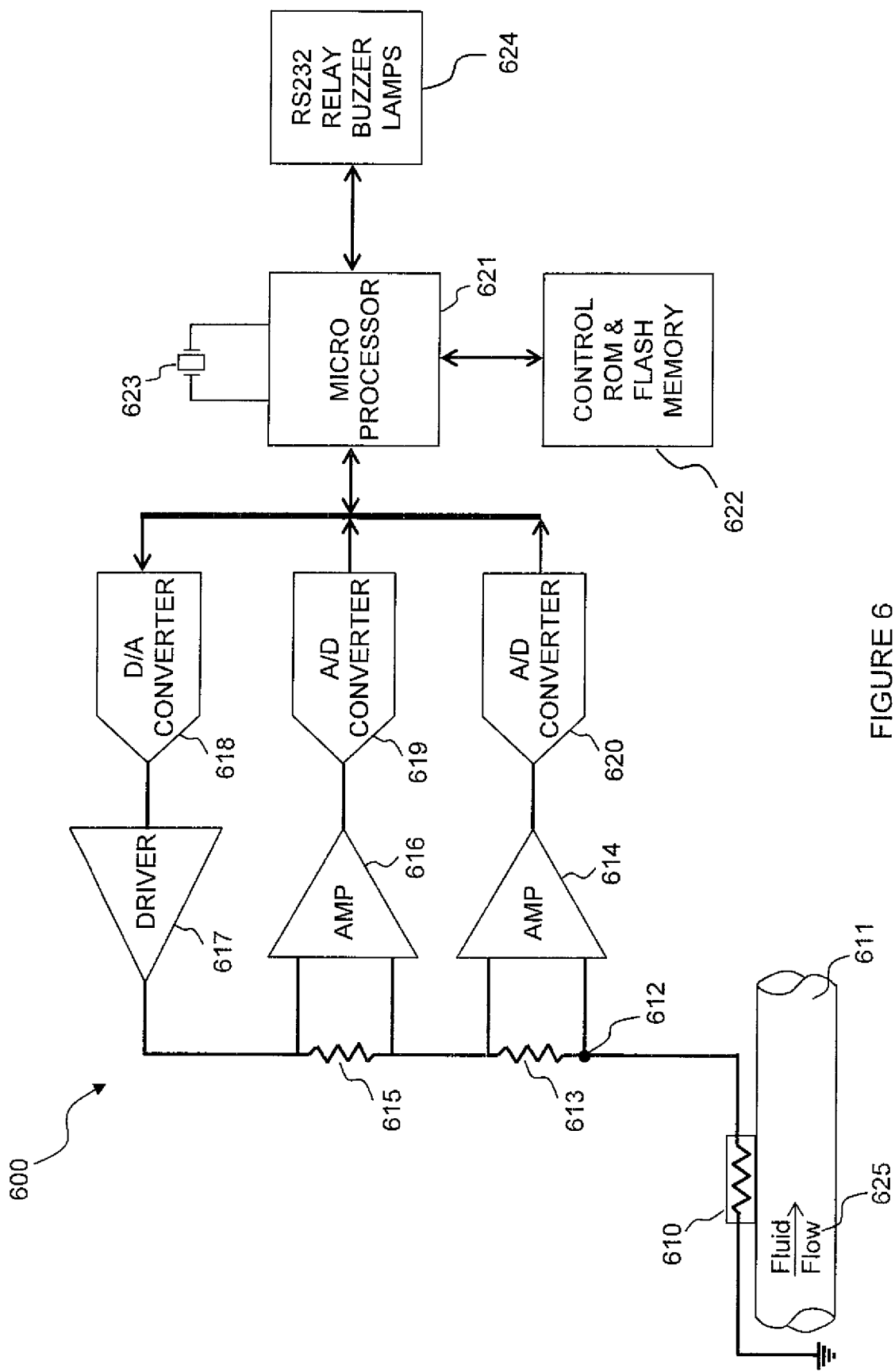
FIG. 6 is an electrical schematic showing the placement of the temperature sensors on the pipe and amplifiers configured to detect the flow signal.

FIG. 6 is an electrical schematic showing the placement of the flow sensor 610 clamped to a water pipe (conduit) 611, and amplifiers 614 and 616 configured to form a circuit to detect the variations in the resistance of the flow sensor 610 produced by the flow of fluid 625 through the conduit 211.

The amplifiers 614 and 616 feed their signals into Analog to Digital Converters 619 and 620 to create a digital representation of the flow signals. The digital representations are then fed to a microprocessor 621 where they are analyzed to determine the flow rate by comparing the flow data to the data stored in the control ROM and flash memory 622. The microprocessor 621 will then perform various functions 624, such as energize a relay, illuminate an LED, or create an audible alarm, based on the measured flow rate as compared to the data stored in memory 622. The microprocessor 621 will also sense the amount of current flow through the flow sensor 610 and adjust it as necessary to maintain a constant electrical current through the flow sensor 610.

Figure 7:
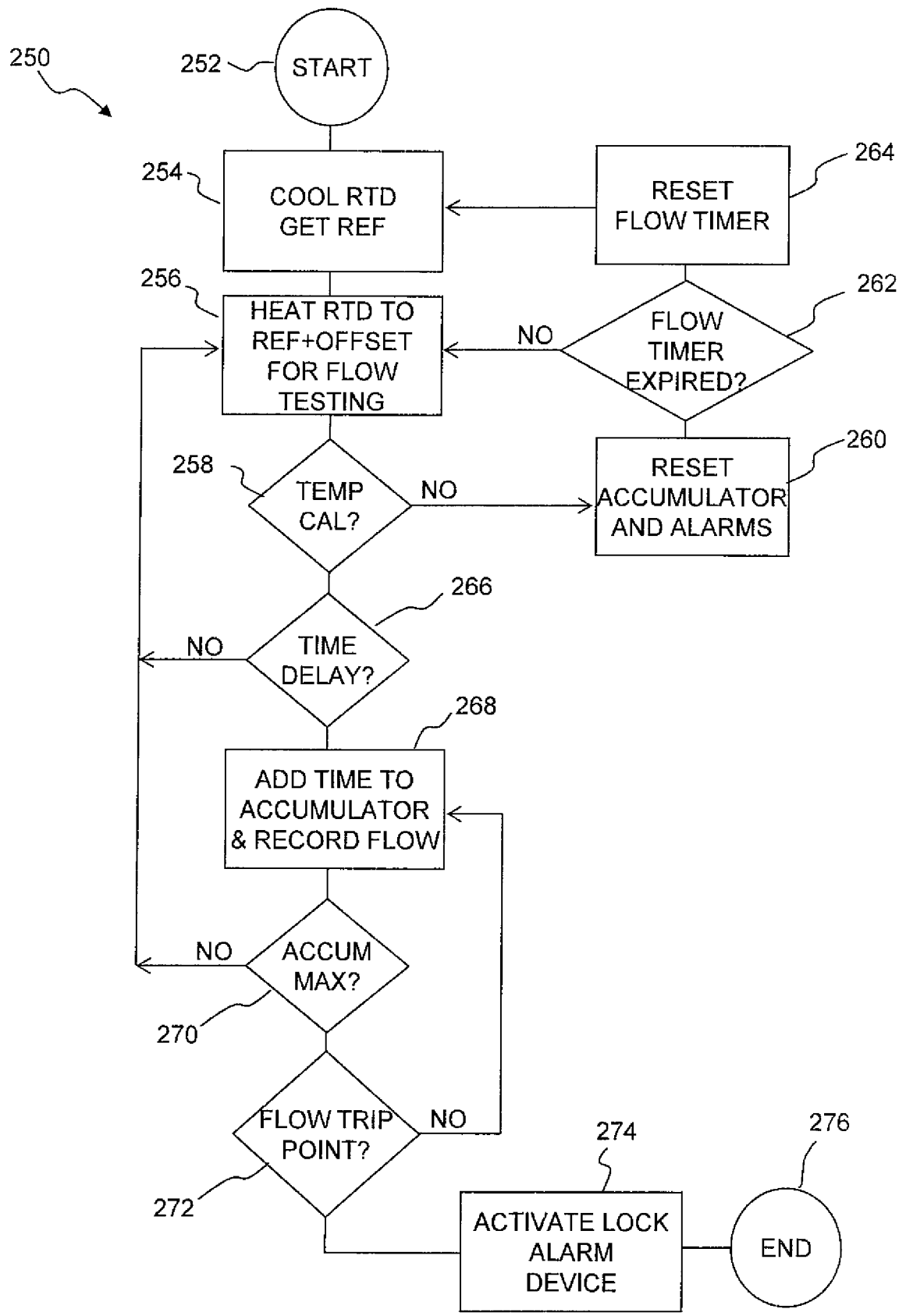
FIG. 7 is an exemplary operational flowchart showing the overall operation of the system of the present invention.

FIG. 7 is an exemplary operational flowchart showing the overall operation of the system of the present invention and is generally referred to as item 250. At the start of the operation 252, the sensor is deenergized to allow it to cool to ambient temperature and establish a baseline temperature for use in future calculations 254. The sensor is then heated to a reference temperature plus an offset temperature 256. If the temperature has not been calibrated 258, then the system will reset the accumulator and alarms 260 and to check to see if the flow timer has expired 262. If the flow timer has expired 262, the system will reset the flow timer 264 then restart the process 254, If the flow timer has not expired 262, the system will go to step 256 to heat the sensor 256.

If the temperature has been calibrated 258, then the system will check for the presence of a time delay 266. If the delay time value has not been reached, the system will return to step 256 to continue heating the RTD. If the delay time value has been reached 266, the system will add time to the accumulator and record flow 268. If the accumulator has not reached its maximum value 270, the system will return to step 256 where it will continue to heat the RTD. If the accumulator has reached its maximum value 270, the system will compare the calculated flow to the flow trip point 272. If the trip point has not been reached 272, the system will return to step 268 where it will add time to the accumulator and record flow. If the trip point has been reached 272, the system will activate functions such as an alarm, an indicator, and automatic valve closure 274. It should be appreciated by someone skilled in the art that many different functions may be controlled by the system and the functions listed above are not the exclusive functions of the system.

Figure 8:
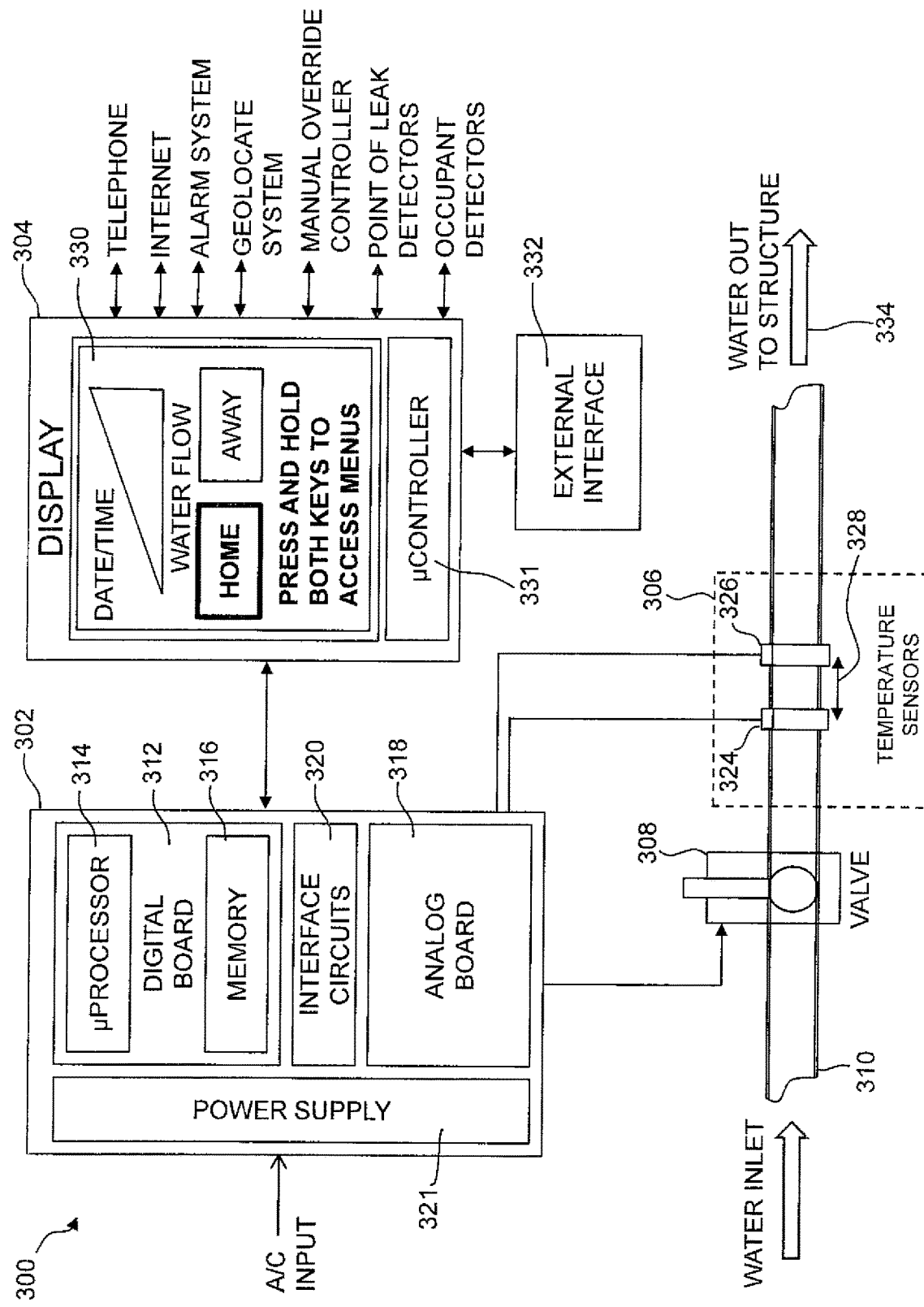
FIG. 8 is a block diagram of an alternative embodiment of the present invention showing dual temperature sensors coupled to analog and digital circuitry, a user interface display and a valve for interrupting fluid flow through a conduit.

FIG. 8 is a diagram of an alternative embodiment of the present invention and is generally designated 300. This diagram shows a clamp on temperature sensor package 306 which includes dual temperature sensors 324 and 326 separated by a known distance 328. The temperature sensor package 306 is coupled to a controller 302 having both analog 318 and digital 312 circuitry, and equipped with a user interface display 304 and a valve 308 for interrupting the flow of water through a pipe or conduit 310 should a leak be detected. The controller 302 has an internal power supply 321, a microprocessor 314 with memory 316, and interface circuits to control such things as the isolation valve 308, temperature sensor package 306, and the display unit 304. The display 304 utilizes a microcontroller 331 to control the user display panel 330, and external interfaces 332 such as telephone, internet, and alarm.

An Alternative Embodiment

Figure 9:
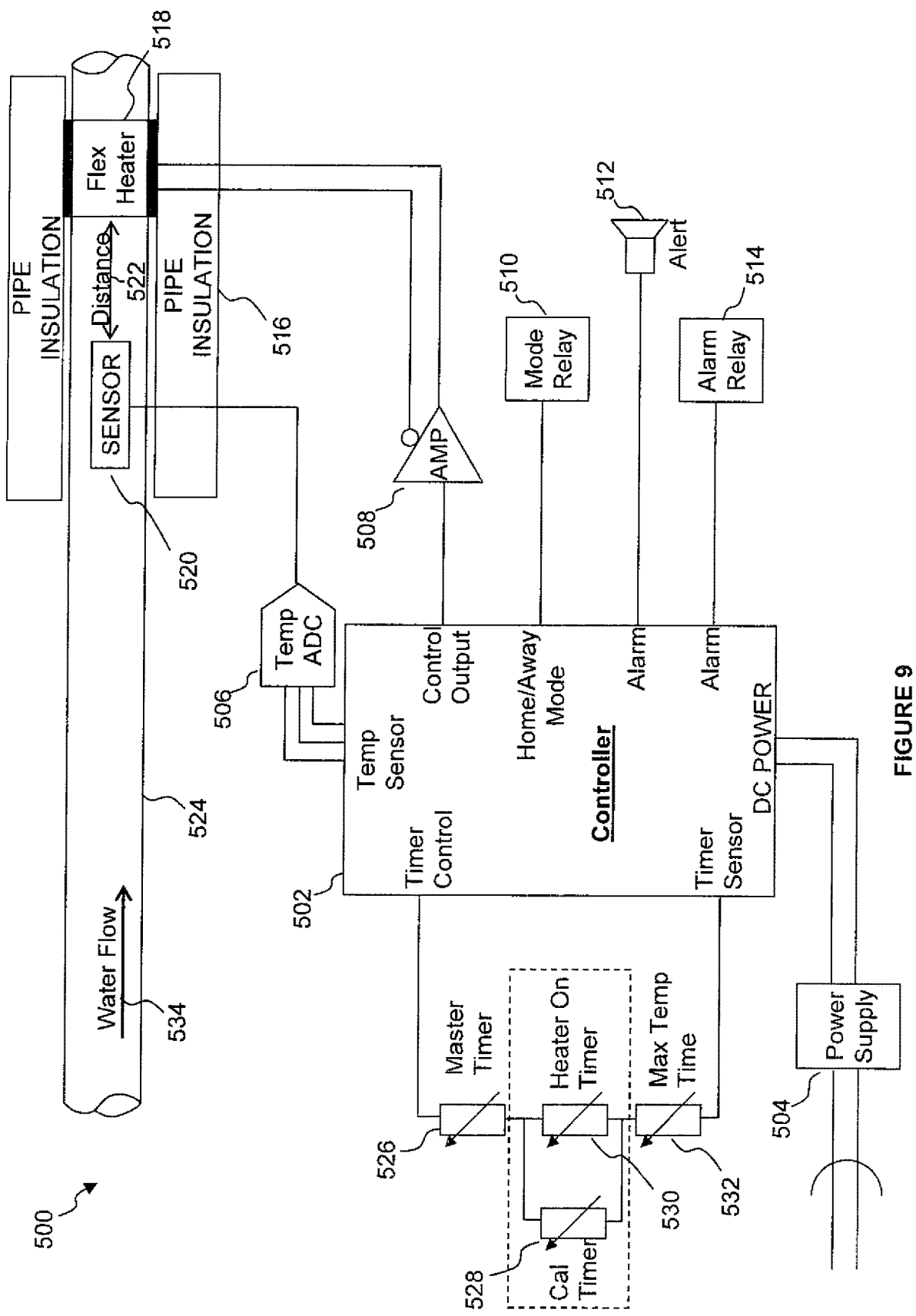
FIG. 9 is a block diagram of an alternative embodiment of the present invention showing a single sensor upstream from a heating element and having a central control unit with various inputs and outputs, alarm and mode control, and timer control. Additionally, the diagram illustrates the interface between the central control unit, the temperature sensor, and the heater.
Figure 10A:
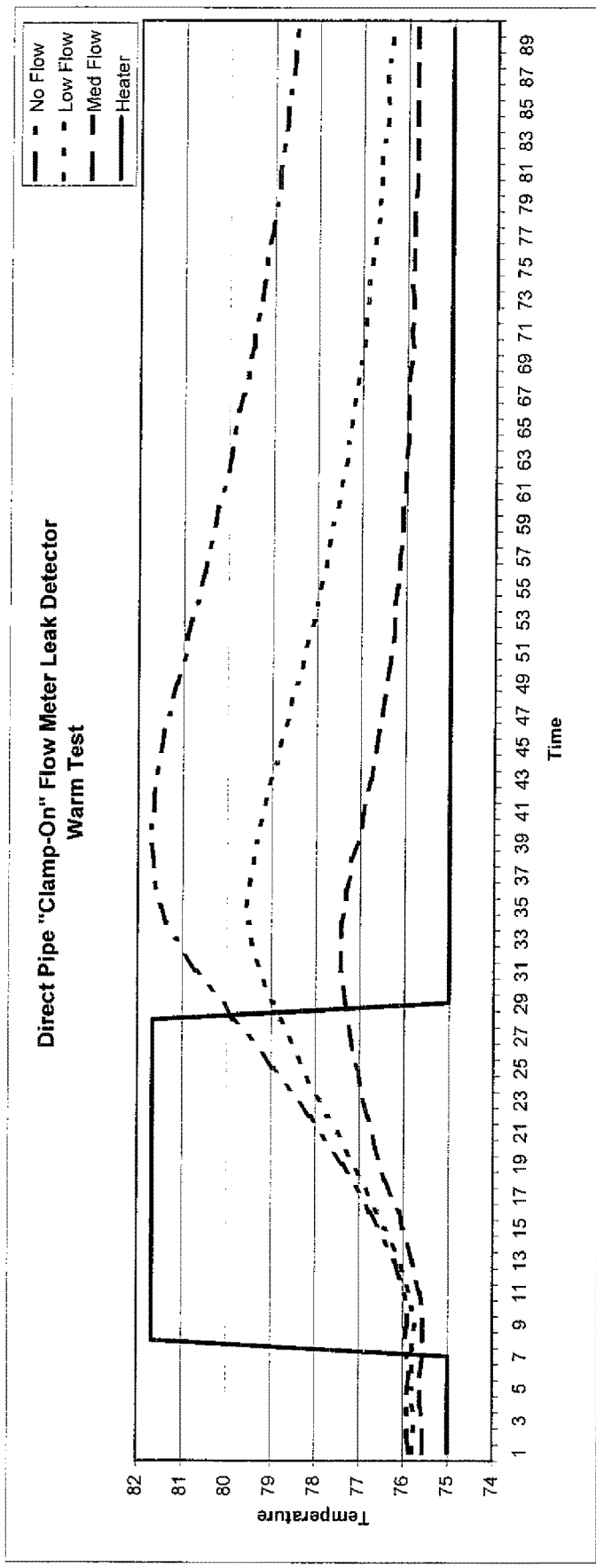
Figure 11A:
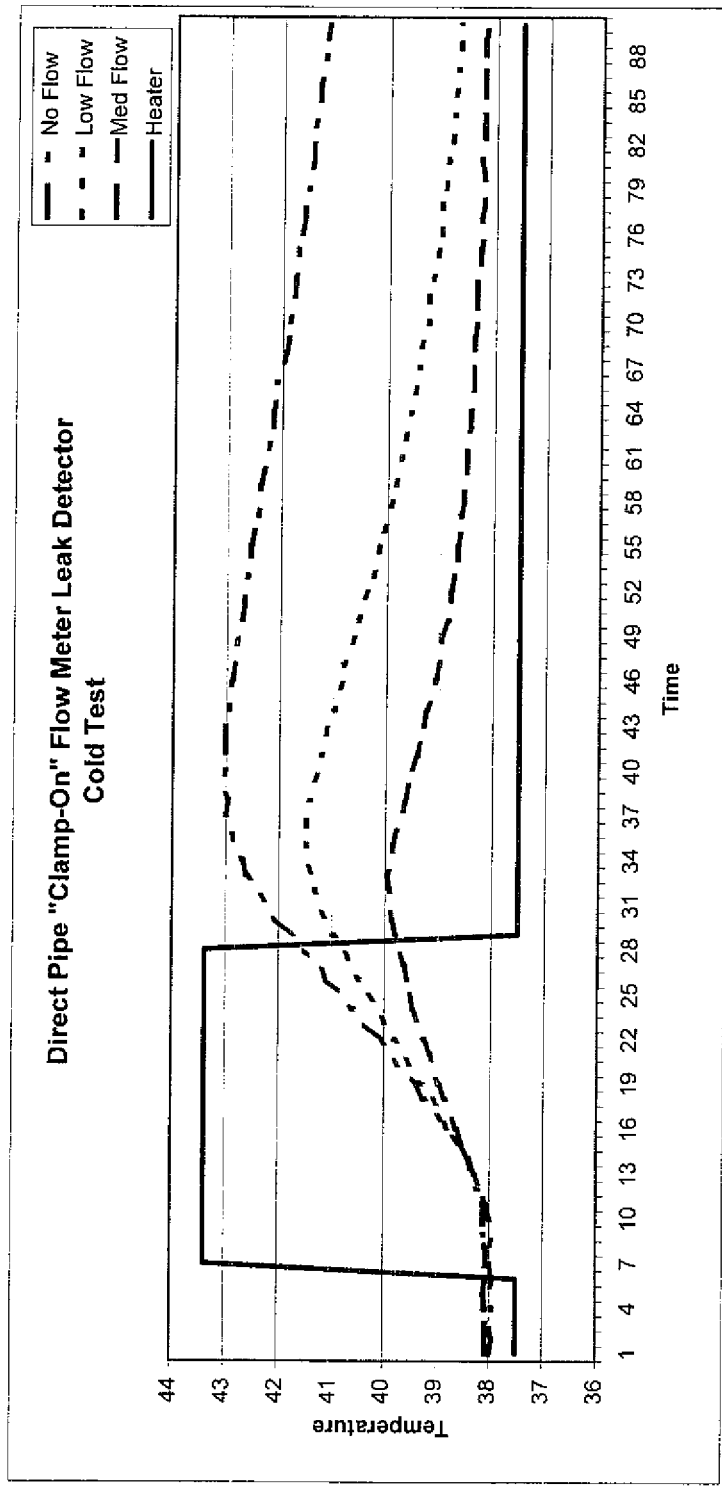

Now referring to FIG. 9, an alternative embodiment of the present invention is shown and is generally designated 500. This embodiment consists of one temperature sensor 520, such as a RTD, thermistor, or thermocouple, clamped onto a pipe or conduit 524 and a heating element 518 mounted a distance 522 downstream from the temperature sensor 520. The temperature sensor 520 and heating element 518 are both wrapped or covered with an insulation material 516 thereby increasing the accuracy and sensitivity of the system.

This alternative embodiment uses heat conduction, propagation, and time to determine if there is liquid flow within an enclosed metallic conduit 524. FIGS. 10A, 10B, 11A and 11B consist of graphs and the associated data points of temperature response to a known amount of heat energy added to a conduit having a no flow, low flow, and medium flow condition. The graphs and data points are for a warm test and cold test respectively. Two elements are required to electrically perform this function. One is a temperature sensor 520, either analog or digital, and the other is a resistive heater band 518 which wraps around the outside diameter of the conduit 524. It should be noted that the heater 518 and sensor 520 are separated by a short distance 522, such as 1" to 3", in order to create more average heating across the conduit 524 cross section, and also allow the internal flowing liquid 534 to carry away the conducted heat via convection cooling of the conduit 524 itself.

In normal operation, this embodiment works in an intermittent operation. After a calibrated tune has elapsed, the heater 518 becomes energized, which forces heat energy into the conduit 524. The controller 502 would read the temperature sensor 520 just prior to heater 518 activation, and stored that value for further calculations. Conducted heat from the metallic conduit 524 will readily propagate from the center of the heat source 518 and outward eventually reaching the temperature sensor 522. The amount of time it takes for the heat to propagate to the temperature sensor 520 is recorded in the controller 502 and is a direct function of the liquid flow 534 within the conduit 524. Long propagation times reflect large effective flow rates.

The heater power is removed after a predetermined "no-flow" condition timer expires. The controller 502 will continue to read the temperature sensor 520 to continually analyze the heat propagation and lock onto a value that represents the peak temperature attained. This value is also a direct function of the liquid flow 534 within the conduit 524. Higher peak temperatures represent low effective flow rates, as the heater 518 is simply creating a no flow "pocket" of liquid, with little to no convective forces to carry away the applied heat energy.

Finally, after a predetermined amount of time has elapsed, the controller 502 acquires one final reading from the temperature sensor 520 and compares it to the previously saved value before the heater 518 was activated. The ratio of the before and after temperature readings is also a direct function of the liquid flow 534 within the conduit 524. The closer the two values are, the greater the effective flow rate is within the conduit 524 as the flowing liquid 534 is restoring the ambient fluid temperature to nullify the effects of the previously added heat energy.

All of the calculated temperature and time variables are scored within an algorithm that normalizes the effective flow rate with respect to ambient temperature and conduit/heater 524/518 thermal conductivity. The calculated score determines the liquid flow 534 rate, then the controller 502 records that rate, powers down for a short period of time as determined by the Master Time value 526, and allows the heater 518 and temperature sensor 520 to return to ambient conditions through natural convection.

As the system continues to move through heating and cooling cycles, the running status is accumulated. If the flow rate over all the cycles has not provided a single "no-flow" score, the system will enter an alarm state where it will either activate a relay 514, create an audible alert 512, or do both. The alarm may be cancelled by stopping the fluid flow or by switching to another mode of operation 510, either HOME or AWAY, which effectively resets all timers and scoring status results.

The heater 518 and temperature sensor 520 must be properly affixed to the conduit 524 to ensure consistent results over a long period of time measured in years. The heater 518 is a flexible silicone band which can wrap around the conduit 524 and be held in place with a self adhesive vulcanizing wrapping tape specifically designed to seal out moisture and provide continuous pressure on the heater 518 ensuring optimal thermal conductivity over time. It is to be appreciated by someone skilled in the art that many heater 518 designs exist that will satisfy the requirements of the system. The temperature sensor 520 also requires the same treatment during installation to ensure that the conduit 524 temperature is properly reported. It is also imperative that the entire heater/sensor 518/520 section, and a few inches beyond, be enclosed in thermal insulation 516. This prevents ambient or environmental air currents from affecting the calibrated flow readings by heating or cooling effects that are not the direct result of the fluid flow 534 within the conduit 524.

Intermittent operation of the heater 518 is required to provide the extended "no-flow" time period with an opportunity equilibrate with ambient conditions. Otherwise, the heater 518 and temperature sensor 520 would create a localized "hot water heater" within the test section of the conduit 524. Therefore, this device may not be used to measure flow rate or flow total as do other technologies, such as Thermal Mass Flow Meters. While this system is currently described to operate through a closed section of copper tubing/pipe 524, it may also operate through plastic conduit provided that the test section has in-molded metal plates or "shoes" within. The heater 518 and temperature sensor 520 requires direct thermal conduction of the fluid within in order to perform the same operation of an all-metal design.

An AC/DC power supply 504 may be used since the heater 518 requires significant energy output (>12 Watts) to perform its tests accurately and reliably. Alarm panel interfacing may also be expanded to include both wired and/or wireless operation for command/control facilities.

Installation and Calibration

This alternative embodiment of the present invention requires about 8"-10" of clean copper pipe 524 to properly assemble the test section. The section of water pipe 524 selected should pass all incoming supply to the entire structure and should not be located outside where protecting the heater 518 and temperature sensor 520 elements would be impossible, Once the heater 518 and temperature sensor 520 have been properly installed and the wiring and power have been completed, the device must be calibrated to the particular installation. Before activating the calibration function, all water flow in the test section must be halted.

The calibration function can be activated by an on-board switch, or wireless command, or a unique mode selection. During calibration, the unit will activate the heater 518. When the temperature sensor 520 records a temperature increase of 4.degree. F.-10.degree. F., the time which passes during this test is recorded by the controller 502 and stored for all future heater timing variables. Calibration finishes automatically and the system will be able to alert the installer if there is a problem or start performing normal operations if all is well.

This invention is a fluid flow meter with many applications and embodiments incorporating a unique method of flow measurement utilizing noninvasive thermal anemometry. The use of a Wheatstone Bridge greatly increases the system sensitivity and accuracy allowing it to be used in many applications.

Freeze Burst Detection and Prevention

Figure 12:
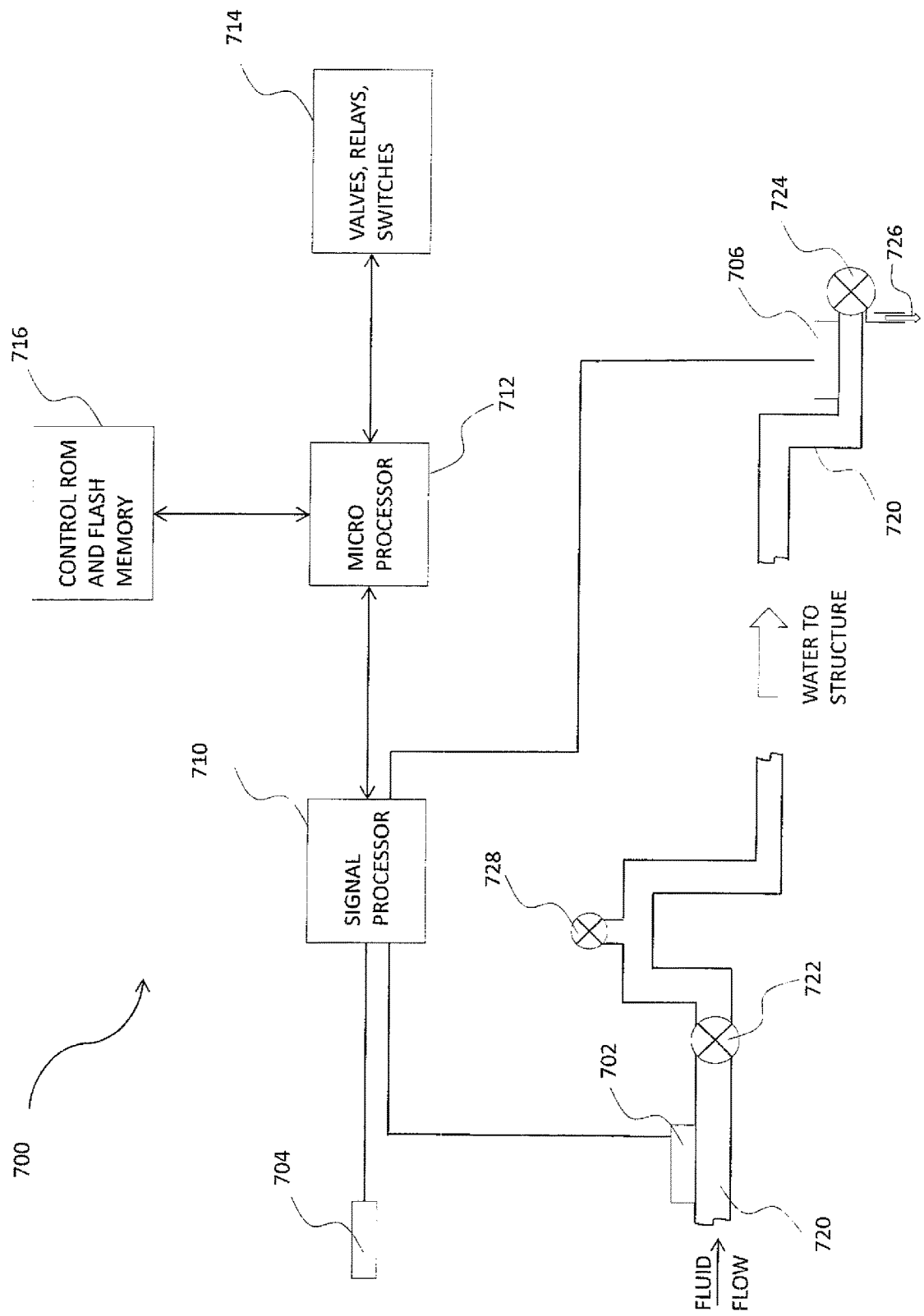
FIG. 12 is a diagram showing two temperature sensor packages attached to a fluid conduit system and an external environment temperature sensor connected to a signal processor to form a circuit to detect changes in fluid temperature, fluid flow rate, and external environment temperatures.

FIG. 12 is a diagram of an alternative embodiment of the present invention and is generally designated 700. The diagram shows a primary temperature sensor package 702, attached near the inlet of a fluid conduit system 720, secondary temperature sensor package 706 attached to the fluid conduit 720 near the termination point, and an external environment temperature sensor 704, all connected to a signal processor 710 to form a circuit to detect variations in the resistance of the sensors. The resistance measurements of the temperature sensor packages 702 and 706 can be used to determine fluid temperature and fluid flow rate simultaneously. It is appreciated by those skilled in the art that alternative temperature sensor packages 702 and 706 may be used utilizing alternative temperature sensing elements such as a thermistor, thermocouple, or resistance temperature detector. The resistance measurements are fed into the signal processor 710 then converted into digital signals representing flow and temperature of the fluid in the conduit. The digital signals are then fed to a microprocessor 712 where they are analyzed to determine the flow rate by comparing the flow data to the data stored in the control ROM and flash memory 716, the temperature by comparing the temperature data to the data stored in the control ROM and flash memory 716, and the temperature difference between the conduit system's 720 inlet and outlet fluid temperatures by comparing the temperature data of temperature sensor packages 702 and 706.

The external environment temperature sensor 704 detects temperature changes in the external, or ambient, environment. The sensor 704 feeds the resistance measurements to the signal processor 710 to create a digital signal of the temperature data which is fed to a microprocessor 712 where it is analyzed to determine the temperature by comparing the temperature data to the data stored in the control ROM and flash memory 716.

The flow and temperature data from the sensors are further analyzed by the microprocessor 712 to determine the state of the fluid by comparing the flow and temperature data of the sensors to the user-inputted data stored in the control ROM and flash memory 716. The microprocessor 712 will perform various functions 714, such as open a valve, energize a relay, illuminate an LED, or create an audible alarm, when the measured flow and temperature data triggers a response based on the user data stored in memory 716.

The diagram shows an isolation valve 722 for interrupting fluid flow into the conduit system 720, a relief valve 724 for releasing the flow of fluid in the system through a drainage pipe 726, and an air valve 728 to allow atmospheric air to enter into the system. Air valve 728 is located at a high point in the system and relief valve 724 is located at a low point near the end of the system, The microprocessor 712 will open relief valve 724 when a value stored in control ROM or flash memory 716 is reached by the sensors 702, 704, and/or 706, For example, at 32 degrees Fahrenheit water freezes and expands, increasing its volume. Therefore if the fluid is water and the temperature is at 32 degrees Fahrenheit a determination that the water is expanding will be made and the relief valve 724 will be opened. If the value is at or below a secondary value stored in control ROM or flash memory 716, such as severe freezing conditions for water, microprocessor 712 will close isolation valve 722 to prevent water from entering the system and open relief valve 724 to evacuate the water in the system. The air valve 726 is then opened to allow atmospheric air to enter the system to aid the evacuation of fluid and prevent the formation of a vacuum. The valves will be installed in locations to allow the most efficient fluid flow through the system, The control ROM and flash memory 716 can store several values for different trigger points such as the temperature difference between inlet and outlet fluid temperatures.

Figure 13:
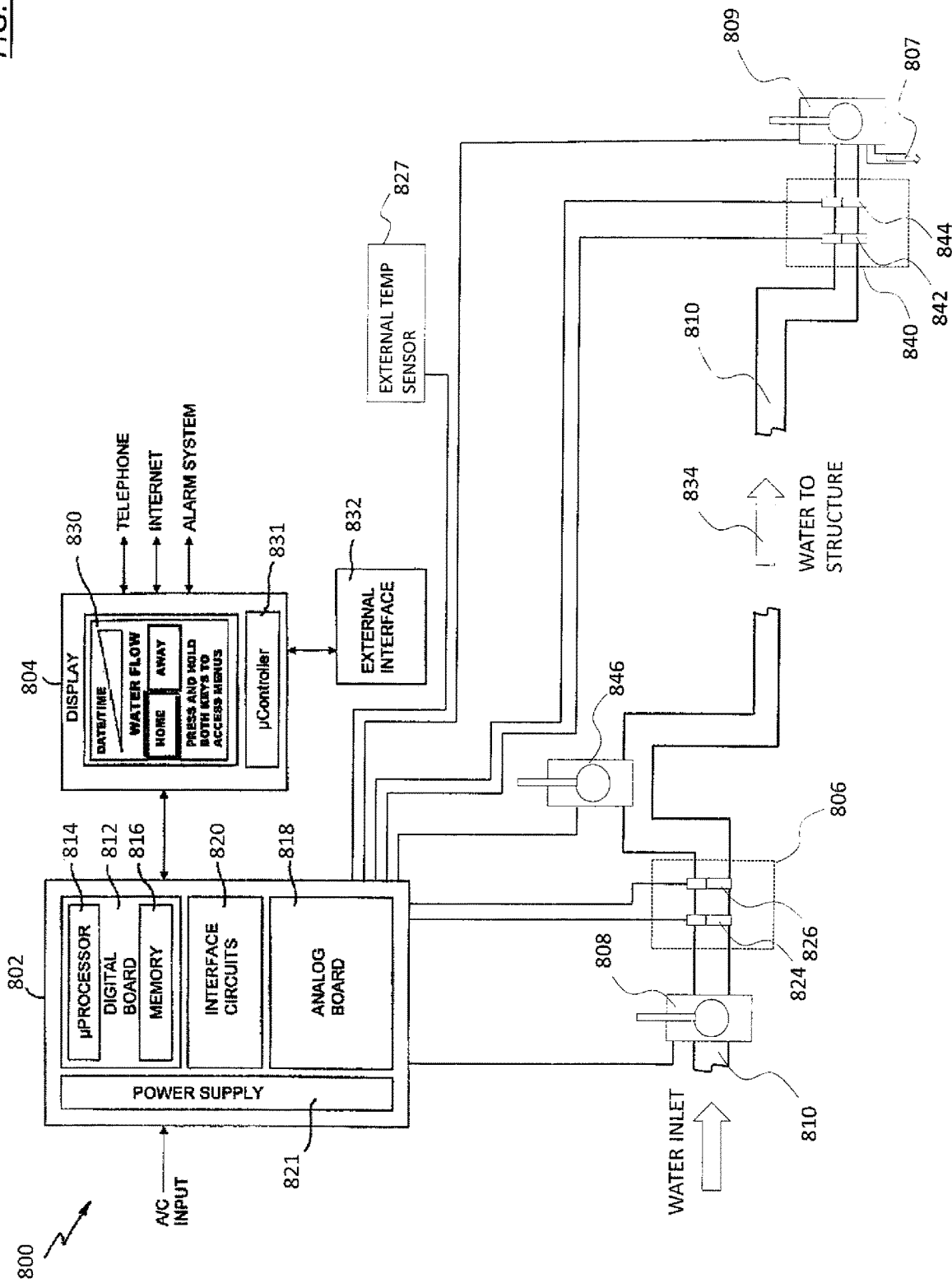
FIG. 13 is a block diagram of an alternative embodiment of the present invention shown in FIG. 12 showing an external environment temperature sensor and two temperature sensor packages coupled to analog and digital circuitry, a user interface display and three valves for controlling fluid flow.

FIG. 13 is a diagram of an alternative embodiment of the present invention shown in FIG. 12 and is generally designated 800. This diagram shows primary clamp on temperature sensor package 806 which includes dual temperature sensors 824 and 826 separated by a known distance, secondary temperature sensor package 840 which includes dual temperature sensors 842 and 844 separated by a known distance, and an external environment temperature sensor 827. The primary temperature sensor package 806, secondary temperature sensor package 840, and external environment temperature sensor 827 is coupled to a controller 802 having both analog 818 and digital 812 circuitry, and equipped with a user interface display 804 and an isolation valve 808 for interrupting the flow of water through a pipe or conduit system 810 should a leak be detected, a relief valve 809 for releasing the flow of water n a pipe or conduit system 810 through a drainage pipe 807 should excess pressure be detected, and an air valve 846 to open the system to the atmosphere. Isolation valve 808 is installed near the inlet of the conduit system 810, air valve 846 is installed at a high point in the system, and relief valve 809 is at a low point near the end of the system. The location of the valves will allow the most efficient fluid flow through the system.

The controller 802 has an internal power supply 821, a microprocessor 814 with memory 816, and interface circuits to control such things as the isolation valve 808, relief valve 809, air valve 846, primary temperature sensor package 806, secondary temperature sensor package 840, external environment temperature sensor 827, and the display unit 804. The display unit 804 utilizes a microcontroller 831 to control the user display panel 830, and external interfaces 832 such as telephone, internet, and alarm.

ANOTHER ALTERNATIVE EMBODIMENT FOR GEOFENCING CONTROL

Figure 14:
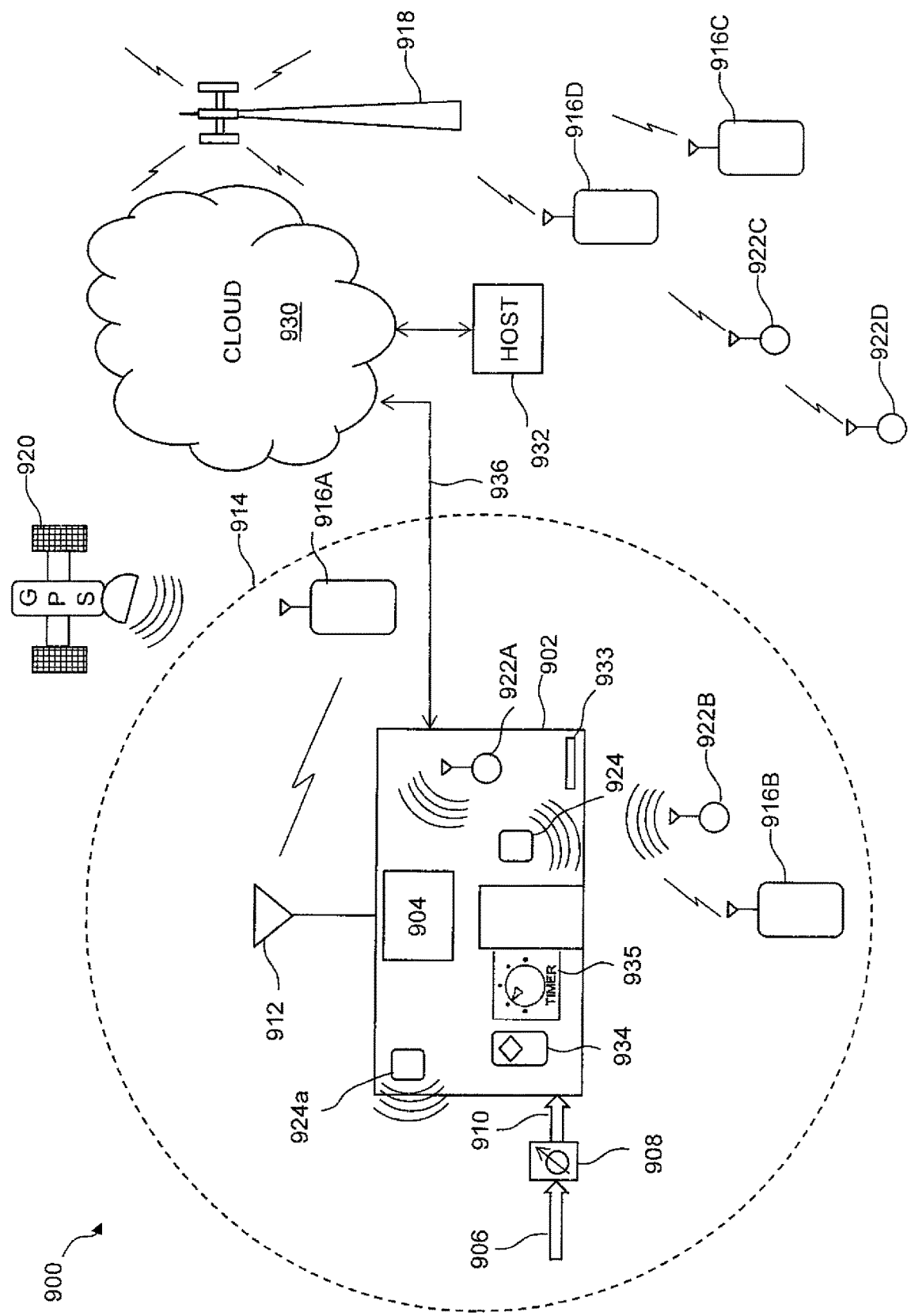
FIG. 14 is a block diagram of an alternative embodiment of the present invention and includes a structure equipped with the present invention surrounded by an exemplary geo-fencing area, and depicts a number of occupant sensors such as RFID tags and readers, occupancy sensors, mobile electronics, and a GPS satellite and cellular communication tower which all cooperate to establish a location-based control of the system to ensure proper HOME and AWAY mode settings.

Referring now to FIG. 14, a block diagram of an alternative embodiment of the present invention is shown and generally designated 900. System 900 includes a structure 902 equipped with the present invention 904 surrounded by an exemplary geo-fencing area 914 and having a water line input 906 with a fluid flow monitor and valve 908 as previously described herein. Downstream from fluid flow monitor and valve 908 is property supply line 910 which provides water supply to the structure 902 and the appliance and fixtures therein. It is contemplated that the fluid flow monitor and valve 908 may be integrated into a single unit for ease of installation without departing from the spirit and scope of the invention. The integrated fluid flow monitor and valve 908 incorporates the fluid flow monitors as previously described herein. It is also contemplated that the fluid flow monitor and valve 908 may be installed inline in existing conduits by cutting a portion of the existing water line and installing the fluid flow monitor and valve 908 in place of the removed portion of the existing water line.

System 904 may be equipped with an antenna 912 which provides wireless communication to other components within the system 900, or to systems or services outside the specific system of the present invention, such as outside service providers (fire, county water services, alarm companies, etc.).

Wireless communication may be accomplished using any wireless communication technique or protocol known in the art.

System 900 includes a location based area 914 which is often referred to as a geographical location area, geo-fencing boundary, or geo-fencing area, that determines a range within which the system may be operated or the presence of an occupant may be sensed. For instance, in a preferred embodiment of the present invention, geo-fencing area 914 may have an outer limit one mile from the structure 902 such that the system can switch from AWAY mode to HOME mode when the occupant approaches. In other circumstances, the system may be set such that the geo-fencing area 914 outer limit is minimal, such as when an occupant enters the structure 902 or comes within 100 feet to ensure that there is only minimal time elapsing between the system switching to the HOME mode and the occupant actually entering the property 902.

In this embodiment, a personal electronic device 916A, such as a cellular telephone or other portable electronic device, receives a Global Positioning Satellite (GPS) signal from a GPS Satellite 920 from which the device can determine its location. This GPS location for device 916 is then compared to the geo-fencing boundary 914 and it is determined whether the device 916 is within the geo-fencing boundary, indicating whether the occupant with the device 916 is within the boundary 914. If the occupant is within the boundary, the system enters the HOME mode, and if not, the system will remain in the AWAY mode.

As shown in FIG. 14, there are a number of portable electronic devices 916, including 916A and 916B which are both within the geo-fencing boundary 914 which would trigger the system to enter the HOME mode. On the other hand, portable electronic devices 916C and 916D are outside the geo-fencing boundary 914 and which would not trigger the system to the HOME mode. In this embodiment, as long as at least one portable electronic device 916 is present within the boundary 914, the system will be in the HOME mode.

As shown in FIG. 14, system 900 includes a cellular telephone communication system 918 which is known in the art, and provides a wireless communication link between devices 916 and system 904, and which may include a traditional wireless telephone connection, or may utilize a wireless data connection, such as through cloud 930 to a host 932, and further through cloud connection 936, such as an Internet connection.

Also shown in FIG. 14, system 900 includes a number of occupant sensors, such as RFID tags 922 and RFID readers 924. In this application, RFID tags 922 are provided to occupants of structure 902. As the occupant approaches structure 902, the RFID tag is passed near an RFID reader 924 to signal that the occupant is returning to the property. For instance, occupant with RFID tag 922A, when entering the property, passes its RFID tag across a conveniently placed RFID reader 924 (such as by the door), which signals the system 900 to enter the HOME mode. In this example, RFID tag 922 is within the geo-fencing boundary 914 and thus may be within range for RFID reader 924 to sense the presence of the occupant, thus entering the HOME mode.

However, as shown in FIG. 14, RFID tags 922C and 922D are both outside the geo-fencing boundary 914 and do not cause system 900 to enter the HOME mode. As long as at least one RFID tag is within range of an RFID reader 924 the system 900 is in the HOME mode.

In a preferred embodiment, property 902 may be equipped with additional RFID readers, such as RFID reader 924A. This allows for the distributed sensing of the presence of an RFID tag 922 within the geo-fencing boundary 914. Using this approach, an occupant need not specifically present the RFID tag 922 to a RFID reader 924; instead, the multiple RFID readers 924, 924A, etc. can sense the presence of the RFID tag 922 anywhere within the geo-fencing boundary maintaining the system in the HOME mode. When an RFID tag is no longer sensed within the geo-fencing boundary 914, the system will switch to the AWAY mode until an RFID tag is again detected within the boundary 914.

The system 900 shown in FIG. 14, as previously shown in FIG. 8, also includes an interface for detecting the presence of an occupant at a particular property. Occupant sensors 934 detect the presence of an occupant through motion or infrared technology. The optical motion sensor technology and infrared technology contemplated herein is any technology known in the art and capable of detecting the presence of an occupant without any action by the occupant.

The system receives input from one or more occupancy sensors 934 and if an occupant is detected, places the system into the HOME mode until occupancy is no longer detected. This allows for the simple and routine detection of an occupant without any special action being required by the occupant to place the system 900 in a HOME or AWAY mode, thus enhancing the usefulness of the system by removing the possible user-error from the operation of the system.

An additional occupancy sensor used in the present invention 900 which can assist in the determination of the presence of an occupant is a temporary bypass timer 935 which can be manually set or triggered. This physical timer may have a fixed time period such as a pushbutton that triggers a 30 minute timer, or may be adjustable such as a dial timer that can be set from 0 to 60 minutes. The timer will allow an occupant, such as a service person (housekeeper, gardener, service technician, etc.), to manually switch the system to the HOME mode as needed, and the timer will automatically return to the AWAY mode with no further action needed. This process can be repeated multiple times of the timer period is insufficient for that particular occupant, but absent an affirmative retriggering of the timer, the system will automatically return to the AWAY mode when the timer expires. Additionally, a manual override controller such as a manually activated timer device may be incorporated to provide a manual temporary bypass feature to place the system in the HOME mode.

In addition to occupant-based detection, system 900 also includes point- of-leak detectors 933. In use, point-of-leak detectors are placed adjacent water- using appliances or fixtures, and detect the presence of water, such as when a laundry supply hose bursts, a toilet tank cracks, or other leak events. The input from these detectors 933 are provided to display 304 and utilized to control the valves and associated flow of water to the leak.

Figure 15:
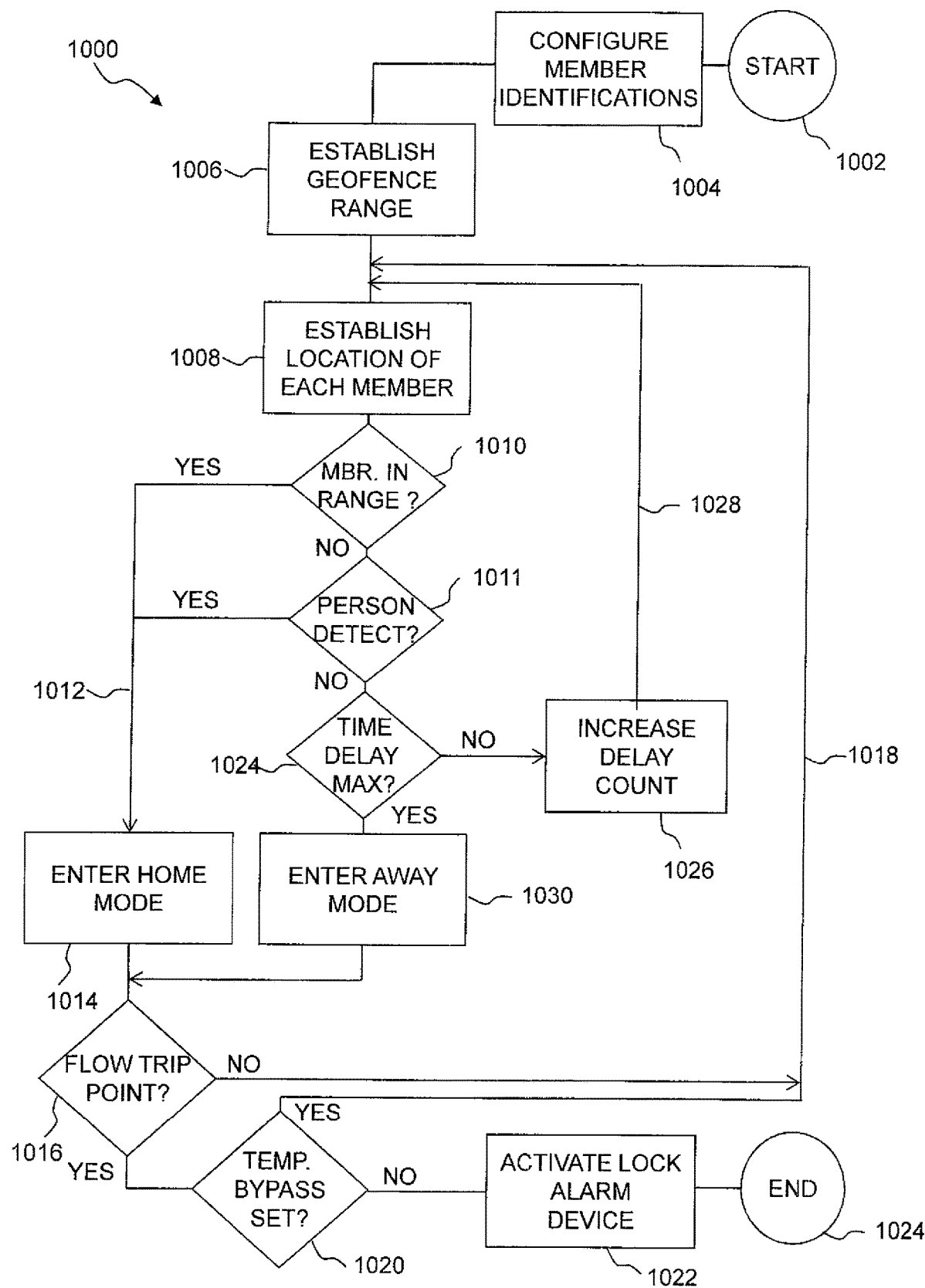
FIG. 15 is an exemplary operational flow chart showing the operation of the present invention utilizing the geo-fencing and occupancy sensing devices to control the HOME and AWAY mode settings to insure prompt reaction to a detected leak.

Referring now to FIG. 15, an exemplary operational flow chart showing the operation of the present invention utilizing the geo-fencing and occupancy sensing devices to control the HOME and AWAY mode settings to insure prompt reaction to a detected leak is shown and generally designated 1000.

Flow chart 1000 begins in step 1002 and proceeds to the configuration of members in step 1004. Specifically, the members that are configured to communicate with a specific system 900 are identified using a portable electronic device 916 (e. g. cellular telephone), or RFID tag 922. Next, the geo-fencing range, or geographical boundary 914, is determined for system 900. This range can be user-determined, and may vary based on the type of property incorporating system 900.

Once each member is configured in step 1004, the location of each member is determined in step 1008. As outlined above, this location determination may be made using GPS data, RFID data, or a combination of such data.

At this point in the flow chart 1000, the location of each member is determined in step 1004, and the geo-fence range has been determined in step 1006. In step 1010, it is determined whether there is any member within the range of the geo-fencing boundary. If no member was determined to be in range in step 1010, step 1011 determines whether a person was detected within the geo-fencing boundary 914, or within the property 902 depending on how the system 900 is configured.

If no person is detected an integrating timer is incremented in step 1024 to avoid false AWAY mode setting by system 900. Specifically, a delay timer is used in flow chart 1000 to require the absence of an occupant for a set period of time before the system switches to an AWAY mode in order to provide for brief instances where the system 900 does not sense the person even though the person has not left the premises, such as if the person entered a closet, bathroom, or was briefly out-of-range of the occupant sensor. If the time delay is not at its maximum, the delay count is increased in step 1026, and the operation returns along path 1028 to continue to check for the presence of members or occupants.

This process repeats until a member is in range in step 1010, a person is detected in step 1011, or the maximum count has been reached as determined in step 1024. If no member is present, no person is detected, and the timer expires, the system 900 enters the AWAY mode in step 1030. If, on the other hand, a member is in range in step 1010, or a person is detected in step 1011, data path 1012 leads to step 1014 where the system is placed in the HOME mode.

Flow chart 1000 steps 1014 and 1030 both lead to the step 1016 where it is determined whether a flow trip point has been reached. This trip point, as described herein, is user-determined and can be set to various limits throughout the day and week to accommodate scheduled activity and consumptions, such setting higher flow limits during periods of laundry, showers, dishwashing, or garden watering, and at lower flow limits during periods of absence, such as working hours or overnight during sleeping hours. If no flow trip point is reached in step 1016, control returns along line 1018 to the main control path and step 1008. On the other hand, if the flow trip point has been reached in step 1016, the system checks to determine whether the manual temporary bypass has been set in step 1020. If the manual temporary bypass has not been set, the system activates flow lock in step 1022, may notify alarms or other responses based on the configuration of system 900, and ends in step 1024. If the temporary bypass has been set as determined in step 1020, the system returns along path 1018 to step 1008 and resumes as described above.

Figure 16:
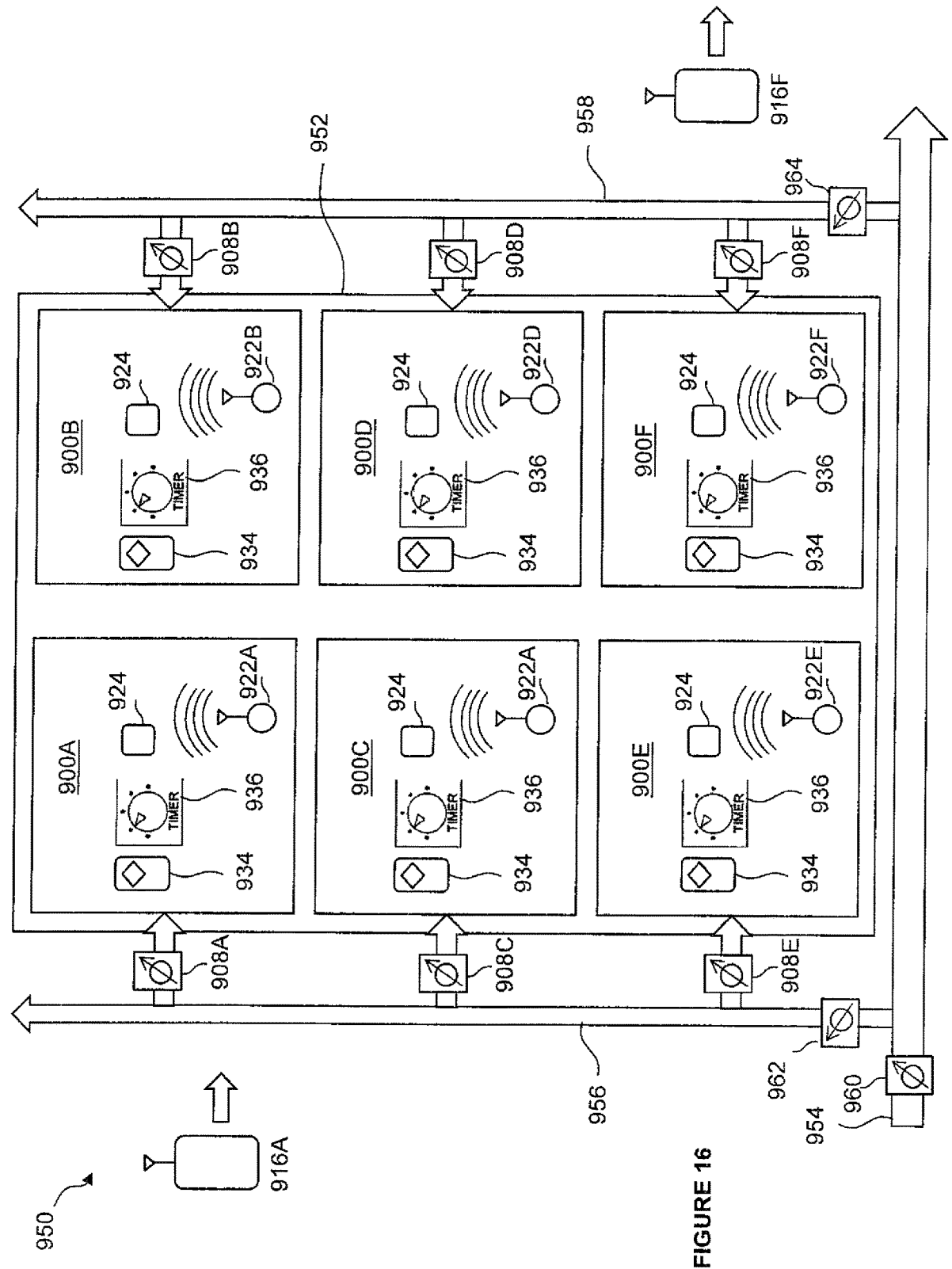
FIG. 16 is a block diagram of the present invention incorporating the geo- fencing and occupancy detection system into a multi-unit property, such as an apartment, showing integration of the motion or infrared sensors, RFID tags and detectors, mobile electronics, and manual timer, which each controls an individual flow monitor and valve controller for a particular unit, and which can be independently operated apart from the remaining units providing a higher level of control than a single property leak detector and controller system, and which can be further expanded within a unit to provide appliance or fixture level detection and fluid control.

Referring now to FIG. 16, a block diagram of the present invention incorporating the geo-fencing and occupancy detection system 900 into a multi- unit property, such as an apartment, is shown and generally designated 950.

Property 952, in this embodiment, is representative of a multi-unit property, such as an apartment or multi-unit industrial property. In this embodiment, the particular use of such property 952 is not limiting, rather, any property having multiple water destinations is fully contemplated herein. The present invention contemplates that the property may be large in nature with multiple separate living units, or a single property having multiple water destinations (appliances and fixtures).

System 950 includes units 900A, 900B, 900C, 900D, 900E, and 900F. Each of these units may be a system 900 of the present invention as described above, or a system having a combination or one or more features and components of system 900. While each unit 900A-F are shown to be duplicates, it is to be appreciated that the configuration of each unit may differ, and no limitations on the applicability of the present invention to various configurations is intended.

Referring to unit 900A, an optical motion and infrared sensor 934 is combined with an RFID tag 922A and corresponding sensor 924. Also, unit 950A is provided with a manual timer 936. As described above, the optical motion and infrared sensor 934, RFID tag and sensor 922A and 924, and timer 936 provide a unit-specific measure of security and operation of system 900.

Also provided is a personal electronic device 916A which corresponds to unit 950A such that when the device 916A is within the geo-fencing boundary (not shown this figure), the system 900 activates to place the system in the HOME mode. Similarly, when personal electronic device 916F leaves the property 952 and no other occupant is detected, the system 900F enters the AWAY mode.

In the event that the system 900 detects a leak or an over-flow condition using flow meter and valve combination 908A, the water flowing from main supply line 954 through branch line 956 can be interrupted using the valve within 908A. In such circumstance, the flow of water to the other unites 900B-F will not be interrupted, with only the water to unit 900A bring interrupted due to the over flow condition. It is to be appreciated that using the same system 900, each of the units 900B-F can be monitored and protected from water damage using the same method and system configuration.

As used herein, RFID tags 922 are identified to communicate with a specific RFID reader 924. As is known in the field of RFID access control, a single RFID tag may be configured to be accepted by more than one RFID reader. For instance, a building maintenance technician may have an RFID tag that is configured to access all RFID readers in property 952, whereas a specific tenant of a single unit will have an RFID tag that is configured to access only that tenant's unit RFID reader.

The system 900 of the present invention can also sense, in a particular configuration, excessive flow to more than one unit, such as the flow through branch line 956 to units 900A, 900C, and 900E. In the event that flow through branch 956 exceeds a predetermined limit and no occupancy is determined in the units it services, flow meter and valve 962 may be activated to shut off water to the entire branch line 956. Similarly, if excessive flow is sensed in branch 958 which services units 900B, 900D, and 900F, flow meter and valve 964 may be activated to shut off flow through branch line 958. Also, in the event that excessive flow is determined to occur in main line 954, flow meter and valve 960 may be activated to shut off supply to the entire building 952.

While FIG. 16 has been described as a building 952 with multiple tenants 900A-F, it is to be appreciated that this exemplary description may be scaled up or down without departing from the present invention. For instance, system 950 can be scaled down such that each "unit" 900A-F represents a specific water-using appliance or fixture within a single home. In this example, a unit may include a toilet, a dishwasher, a sprinkler system, or any device that utilizes a water supply. Likewise, each main and branch line 954, 956 and 958 may represent various plumbing branches within a home leading to each water- using appliance. Using this scaled down version of system 950, each water- consuming component in a home may be protected to thereby provide a high degree of clarity on what particular device is experiencing an over-flow condition while allowing the other properly functioning systems to continue normal operation. This component-level over-flow detection also provides the user with a specific fault condition for a specific appliance or fixture instead of a whole- house fault which in some cases can result in increased diagnostics and repair costs, and possible increased water damages.

The system 950 may also be scaled up to accommodate large buildings with multiple units over multiple floors to provide a high degree of location specific over-flow detection. Likewise, this system 950 may be scaled larger to provide for building to building level flow monitoring, and even block to block levels of measurement and control depending on the environment of the system and its installation purpose.

While there have been shown what are presently considered to be preferred embodiments of the present invention, it will be apparent to those skilled in the art that various changes and modifications can be made herein without departing from the scope and spirit of the invention.

What is claimed is:

1. A device for interrupting a flow of fluid upon detection of a leak, comprising: a primary valve having a flow meter and in fluid communication with a fluid conduit delivering fluid to a property having a plurality of water destinations; a plurality of unit valves comprising a unit valve for each water destination of the plurality of water destinations, each unit valve having a flow meter; means to detect an occupant at each water destination, wherein an occupied signal is generated upon detection of an occupant at the water destination and a vacant signal is generated when an occupant is not detected at the water destination; and a controller configured to receive occupied signals and vacant signals for each water destination from the means to detect an occupant at each water destination and to monitor the flow meter of the valve for each water destination for which a vacant signal is detected in order to detect a leak, wherein upon detection of a leak at a single water destination of the plurality of water destinations, the unit valve for the water destination is closed; and wherein upon detection of a leak at at least two water destinations of the plurality of water destinations when a vacant signal is detected, the primary valve is closed.

2. The device for interrupting a flow of fluid upon detection of a leak of claim 1, wherein the means to detect the occupant at each water destination comprises motion sensors.

3. The device for interrupting a flow of fluid upon detection of a leak of claim 1, wherein the means to detect the occupant at each water destination comprises infrared sensors.

4. The device for interrupting a flow of fluid upon detection of a leak of claim 1, wherein the means to detect the occupant at each water destination comprises radio frequency identification tags and readers.

5. The device for interrupting a flow of fluid upon detection of a leak of claim 1, wherein the means to detect the occupant at each water destination comprises one or more personal electronic devices.

6. The device for interrupting a flow of fluid upon detection of a leak of claim 1, wherein the primary valve is closed when the flow meter of the primary valve indicates flow above a predetermined excessive flow threshold.

7. A device for interrupting a flow of fluid upon detection of a leak, comprising: a primary valve having a flow meter and in fluid communication with a fluid conduit delivering fluid to a property having a plurality of water destinations; a plurality of unit valves comprising a unit valve for each water destination of the plurality of water destinations, each unit valve having a flow meter; a controller configured to establish a geo-fencing boundary about the primary and unit valves and in communication with the primary and unit valves and the flow meters of the primary and unit valves; and a plurality of occupant sensors configured to detect an occupant within the geo-fencing boundary and output an occupied signal when a person is detected and output a vacant signal when no person is detected for a predetermined period of time, wherein each occupant sensor is in communication with the controller, wherein the controller is further configured to monitor the flow meters for an away fluid flow rate threshold upon detection of the vacant signal and output an away leak signal when the away fluid flow rate threshold is met for a water destination, to monitor the flow meters for a home fluid flow rate threshold upon detection of the occupied signal and output a homeleak signal when the home fluid flow rate threshold is met for a water destination, and to close the primary valve upon detection of an away leak signal for at least two units and close the primary valve upon detection of the home leak signal for at least two units, and to close a unit valve of the plurality of unit valves upon detection of the home leak signal or the away leak signal for the corresponding unit.

8. The device for interrupting a flow of fluid upon detection of a leak of claim 7, wherein the occupant sensors are motion sensors.

9. The device for interrupting a flow of fluid upon detection of a leak of claim 7, wherein the occupant sensors are infrared sensors.

10. The device for interrupting a flow of fluid upon detection of a leak of claim 7, wherein the occupant sensors each comprise:
   a radio frequency identification tag; and
   a radio frequency identification reader.

11. The device for interrupting a flow of fluid upon detection of a leak of claim 7, wherein the occupant sensors each comprise:
   a GPS enabled device; and
   a means to determine a location of said GPS enabled device.

12. A device for interrupting a flow of fluid upon detection of a leak, comprising:
   a primary valve having a flow meter and in fluid communication with a fluid conduit delivering fluid to a multi-unit property having a plurality of units;
   a plurality of unit valves comprising a unit valve for each unit of the plurality of units, each unit valve having a flow meter;

means to detect an occupant at each unit; and means for detecting an overflow condition in each unit and generating a home leak signal in response thereto when an occupant is present at the unit, and generating an away leak signal in response thereto when no occupant is present at the unit;

wherein the valve of a unit of the plurality of units closes in response to a home leak signal or away leak signal generated for the unit; and wherein the primary valve closes when the home leak signal or the away leak signal is detected and indicates a leak in at least two units of the plurality of units.

13. The device for interrupting a flow of fluid upon detection of a leak of claim 12, wherein the means to detect the occupant at each unit comprises a controller configured to establish a geo-fence boundary.

14. The device for interrupting a flow of fluid upon detection of a leak of claim 13, wherein the controller is further configured to detect the home leak signal and the away leak signal.

15. The device for interrupting a flow of fluid upon detection of a leak of claim 13, wherein the means to detect the occupant at each unit further comprises: a portable electronic device having a global positioning satellite position detector capable of determining a position; means for communicating the position to the controller; means for comparing the position to the geo-fence boundary; and means for temporarily overriding the operation of the geo-fence boundary.

16. The device for interrupting a flow of fluid upon detection of a leak of claim 12, wherein the means to detect the occupant at each unit comprises an occupant sensor in each unit.

17. The device for interrupting a flow of fluid upon detection of a leak of claim 16, wherein the occupant sensor in each unit comprises a motion sensor.

18. The device for interrupting a flow of fluid upon detection of a leak of claim 16, wherein the occupant sensor in each unit comprises an infrared sensor.

19. The device for interrupting a flow of fluid upon detection of a leak of claim 16, wherein the occupant sensor in each unit comprises a radio frequency identification tag and reader.

20. The device for interrupting a flow of fluid upon detection of a leak of claim 16, wherein the occupant sensor in each unit comprises a bypass timer.

* * * * *